(12) United States Patent
Wojsznis et al.

(10) Patent No.: US 8,280,533 B2
(45) Date of Patent: Oct. 2, 2012

(54) CONTINUOUSLY SCHEDULED MODEL PARAMETER BASED ADAPTIVE CONTROLLER

(75) Inventors: Peter Wojsznis, Cedar Park, TX (US); Terrence Lynn Blevins, Round Rock, TX (US); Wilhelm K. Wojsznis, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 500 days.

(21) Appl. No.: 12/489,106

(22) Filed: Jun. 22, 2009

(65) Prior Publication Data
US 2009/0319060 A1 Dec. 24, 2009

Related U.S. Application Data

(63) Continuation-in-part of application No. 11/534,943, filed on Sep. 25, 2006, now Pat. No. 7,551,969, which is a continuation of application No. 10/419,582, filed on Apr. 21, 2003, now Pat. No. 7,113,834, which is a continuation-in-part of application No. 09/597,611, filed on Jun. 20, 2000, now Pat. No. 6,577,908.

(51) Int. Cl.
*G05B 13/02* (2006.01)
*G06F 7/60* (2006.01)
*G06F 17/10* (2006.01)

(52) U.S. Cl. ............... 700/31; 700/37; 700/42; 700/44; 700/45; 703/2

(58) Field of Classification Search .............. 700/28–33, 700/37, 42, 44, 45; 703/2
See application file for complete search history.

(56) References Cited

U.S. PATENT DOCUMENTS

| | | | |
|---|---|---|---|
| 4,641,235 A | 2/1987 | Shigemasa et al. | |
| 5,018,215 A | 5/1991 | Nasr et al. | |
| (Continued) | | | |

FOREIGN PATENT DOCUMENTS

JP    59-133605 A    8/1984
(Continued)

OTHER PUBLICATIONS

Wojsznis et al., "Evaluating PID adaptive techniques for industrial implementation", Proceedings of the 2002 American Control Conference, vol. 2, Publication Year: 2002, pp. 1151-1155.*

(Continued)

*Primary Examiner* — Crystal J Barnes-Bullock
(74) *Attorney, Agent, or Firm* — Marshall, Gerstein & Borun LLP

(57) ABSTRACT

An adaptive process controller performs continuously scheduled process model parameter interpolation to determine a particular set of process model parameters which are used to develop controller tuning parameters for controller tuning. More particularly, a state-based, adaptive PID controller described herein uses a new technique to determine an appropriate process model to be used to perform adaptive tuning over the various operating regions of the plant, and in particular, uses a process model parameter determination technique that enables continuously scheduled process model parameter update over the various plant operating regions or points. The use of this continuously scheduled process model parameter update method provides for smoother transitions between tuning parameters used in the PID controller during adaptive tuning procedures which are implemented based on changes in the operating region or the operating point of the process, thereby providing for better overall control.

34 Claims, 15 Drawing Sheets

U.S. PATENT DOCUMENTS

| | | | |
|---|---|---|---|
| 5,043,863 A | 8/1991 | Bristol et al. | |
| 5,159,547 A | 10/1992 | Chand | |
| 5,180,896 A | 1/1993 | Gibby et al. | |
| 5,272,621 A | 12/1993 | Aoki et al. | |
| 5,335,164 A | 8/1994 | Gough, Jr. et al. | |
| 5,406,474 A * | 4/1995 | Hansen | 700/37 |
| 5,408,405 A | 4/1995 | Mozumder et al. | |
| 5,453,925 A | 9/1995 | Wojsznis et al. | |
| 5,461,559 A | 10/1995 | Heyob et al. | |
| 5,568,378 A | 10/1996 | Wojsznis | |
| 5,587,899 A | 12/1996 | Ho et al. | |
| 5,619,618 A | 4/1997 | Bigus | |
| 5,625,552 A | 4/1997 | Mathur et al. | |
| 5,680,866 A | 10/1997 | Kangas et al. | |
| 5,748,467 A | 5/1998 | Qin et al. | |
| 6,041,320 A | 3/2000 | Qin et al. | |
| 6,049,738 A | 4/2000 | Kayama et al. | |
| 6,128,541 A | 10/2000 | Junk | |
| 6,249,712 B1 | 6/2001 | Boiquaye | |
| 6,330,484 B1 | 12/2001 | Qin | |
| 6,353,766 B1 | 3/2002 | Weinzierl et al. | |
| 6,404,581 B1 | 6/2002 | Shah | |
| 6,445,962 B1 | 9/2002 | Blevins et al. | |
| 6,445,963 B1 * | 9/2002 | Blevins et al. | 700/44 |
| 6,577,908 B1 | 6/2003 | Wojsznis et al. | |
| 6,745,088 B2 | 6/2004 | Gagne | |
| 6,879,971 B1 | 4/2005 | Keeler et al. | |
| 6,901,300 B2 * | 5/2005 | Blevins et al. | 700/46 |
| 6,970,750 B2 * | 11/2005 | Wojsznis et al. | 700/28 |
| 7,113,834 B2 | 9/2006 | Wojsznis et al. | |
| 7,200,495 B2 | 4/2007 | Desai | |
| 7,444,191 B2 * | 10/2008 | Caldwell et al. | 700/29 |
| 7,451,065 B2 | 11/2008 | Pednault et al. | |
| 7,551,969 B2 | 6/2009 | Wojsznis et al. | |
| 7,738,975 B2 * | 6/2010 | Denison et al. | 700/29 |
| 7,840,287 B2 * | 11/2010 | Wojsznis et al. | 700/38 |
| 7,856,281 B2 * | 12/2010 | Thiele et al. | 700/32 |
| 8,036,760 B2 * | 10/2011 | Mehta et al. | 700/29 |
| 8,046,096 B2 * | 10/2011 | Denison et al. | 700/117 |
| 8,046,200 B2 * | 10/2011 | Kirby et al. | 703/2 |
| 2002/0133329 A1 | 9/2002 | Kano et al. | |
| 2003/0212678 A1 | 11/2003 | Bloom et al. | |
| 2005/0065621 A1 | 3/2005 | Liu et al. | |
| 2005/0149209 A1 | 7/2005 | Wojsznis et al. | |
| 2007/0021850 A1 | 1/2007 | Wojsznis et al. | |
| 2007/0078533 A1 | 4/2007 | Caldwell et al. | |
| 2008/0306895 A1 | 12/2008 | Karty | |
| 2009/0112335 A1 * | 4/2009 | Mehta et al. | 700/29 |
| 2009/0198350 A1 * | 8/2009 | Thiele | 700/30 |
| 2009/0319060 A1 * | 12/2009 | Wojsznis et al. | 700/30 |
| 2010/0301875 A1 * | 12/2010 | Roff et al. | 324/629 |

FOREIGN PATENT DOCUMENTS

| | | |
|---|---|---|
| JP | 04-252302 A | 9/1992 |
| WO | WO-97/12300 | 4/1997 |
| WO | WO-00/33209 | 6/2000 |
| WO | WO-01/79945 A1 | 10/2001 |
| WO | WO-01/98845 | 12/2001 |
| WO | WO-2008/040019 A2 | 4/2008 |
| WO | WO-2009/099944 A2 | 8/2009 |

OTHER PUBLICATIONS

Second Office Action for Chinese Application No. 200810185997.7, dated May 11, 2011.
"Key Technologies," Emerson Process Management (1996-2007). Retrieved from the Internet on May 10, 2007: URL:http://easydeltav.com/keytechnologies/index.asp.
"Getting Started with Your DeltaV™ Software," Fisher-Rosemount Systems Inc. (2003).
Astrom et al "Industrial Adaptive Controllers Based on Frequency Response Techniques," *Automatica*, 27(4):599-609 (1991).
Astrom et al., "PID Controllers: Theory, Design, and Tuning," PID Controllers, $2^{nd}$ Edition, pp. 230-272 (1995).
De Persis et al., "Further results on switched control of linear systems with constraints," *Proceedings of the 41st IEEE Conference on Decision and Control*, Las Vegas, NV, USA, pp. 2810-2815 (2002).
Examination Report under Section 18(3) for GB 0408598.1, dated Feb. 14, 2006.
Gendron, "Improving the Robustness of Dead-Time Compensators for Plants with Unknown of Varying Delay." *Control Systems 90 Conference* (1990).
Gendron et al., "Simple Adaptive Digital Dead-Time Compensators for Low-Order SISO Processes," pp. 1179-1184 (1991).
Hanagud et al., "Artifical Intelligence—Based Model-Adaptive Approach to Flexible Structure Control", *American Institute of Aeronautics and Astronautic's, Inc.*, 13(3): 534-544 (1990).
Hespanha et al., "Overcoming the Limitations of Adaptive Control by Means of Logic-based Switching," *Science Direct*, 49(1):49-65 (2003).
Hespanha et al., "Stabilization of Nonholonomic Integrators via Logic-Based Switching," *Automatica*, 35(3):385-394 1999.
International Search Report for International Application No. PCT/US01/19706, dated Oct. 23, 2001.
Jadbabaie et al., "Coordination of Groups of Mobile Autonomous Agents Using Nearest Neighbor Rules," *IEEE Transactions on Automatic Control*, 48(6):988-1001 (2003).
Liberazon et al., "Basic Problems in Stability and Design of Switched Systems," *IEEE Control Systems Magazine*, 19(5):59-70 (1999).
Liberzon et al., "Stability of Switched Systems: a Lie-algebraic Condition," *Systems and Control Letters*, 37:117-122 (1999).
Morse et al., "Applications of Hysteresis Switching in Parameter Adaptive Control," *IEEE Transactions on Automatic Control*, 37(9):1343-1354 (1992).
Morse et al., "Logic-Based Switching Strategies for Self-Adjusting Control, " *IEEE 33rd Conference on Decision and Control* (1994).
Morse, "A Bound for the Disturbance-to-Tracking-Error Gain of a Supervised Set-Point Control System," *Perspectives in Control: Theory and Applications*, pp. 23-41, Dorothee Normand-Cyrot (ed.), Spring Verlag (1998).
Morse, "Control Using Logic-based Swtiching," *Trends in Control: A European Perspective*, Alberto Isidori (ed.), Springer Verlag (1995).
Narendra et al, "Adaptive Control Using Multiple Models," *IEEE Transactions on Automatic Control*, 42(2):171-187 (1997).
Notice of Reasons for Rejection for Japanese Patent Application No. 2004-124570, dated Jun. 4, 2009.
Office Action for corresponding Chinese Application No. 2004100368503.
Pait et al., "A Cyclic Seitching Strategy afor Parameter-Adaptive Control," *IEEE Transactions on Automatic Control*, 39(6):1172-1183 (1994).
Search Report under Section 17(5) for Application No. 0408598.1, dated Aug. 18, 2004.
Shinskey et al., "Process Control Systems: Application, Design and Tuning," 4th ed., McGraw-Hill, New York (1996).
Wojsznis et al., "Adaptive Feedback/Feedforward PID Controller", The Instrumentation, Systems and Automation Society, Presented at ISA Expo (2003).
European Search Report for Application No. 10166018.1-1239, dated Nov. 10, 2010.
Search Report for Application No. GB1008321.0, dated Sep. 8, 2010.
Yamamoto, Toru, Design of Self-tuning PID Control System and Its Application to Polystyrene Polymerization Reactor, System/Control/Information, Japan, The Institute of Systems, Control and Information Engineers, Nov. 15, 1994, vol. 7, No. 11, pp. 448-460.
Yamamoto, Toru, Design of Self-tuning PID Controller Based on Generalized Minimum Variance Control Law, System/Control/Information, Japan, The Institute of Systems, Control and Information Engineers, Jan. 15, 1998, vol. 11, No. 1, pp. 1-9.

* cited by examiner

MODEL SET

STATE $S_{i-k}$ DEVELOPMENT
$S_{i-k}(d(t), y(t), u(t), SP)$

STATE $S_i$: $S_i$ INITIAL PARAMETER VALUES
$Mod_i, ..., Mod_j$

STATE $S_j$: $S_j$ INITIAL PARAMETER VALUES
$Mod_k, ..., Mod_l$

STATE $S_k$: $S_k$ INITIAL PARAMETER VALUES
$Mod_m, ..., Mod_n$

*FIG. 9A*

CONTINUOUSLY SCHEDULED MODEL PARAMETER BASED ADAPTIVE CONTROLLER

CROSS REFERENCE TO RELATED APPLICATIONS

This application is a continuation-in-part of U.S. patent application Ser. No. 11/534,943 filed Sep. 25, 2006 and entitled "State Based Adaptive Feedback Feedforward PID Controller," which issued as U.S. Pat. No. 7,551,969 on Jun. 23, 2009, which is a continuation of U.S. patent application Ser. No. 10/419,582 filed Apr. 21, 2003, entitled "State Based Adaptive Feedback Feedforward PID Controller" which issued as U.S. Pat. No. 7,113,834 on Sep. 26, 2006, and which is a continuation-in-part of U.S. patent application Ser. No. 09/597,611 filed on Jun. 20, 2000, entitled "Adaptive Feedback/Feedforward PID Controller" and which issued as U.S. Pat. No. 6,577,908 on Jun. 10, 2003, the entire specification of each of which is hereby expressly incorporated by reference herein.

TECHNICAL FIELD

This patent generally relates to process control techniques and, more particularly, to a model based, adaptive controller, such as a proportional, integral, derivative (PID) controller, which uses continuously scheduled model parameter values derived from interpolations of various ideal process model parameters at different values of a state parameter to perform adaptive tuning.

DESCRIPTION OF THE RELATED ART

It is known in the art to use logic-based controller switching strategies to implement adaptive process control in automated systems, such as large manufacturing plants and chemical refineries, for example. An exemplary discussion of logic-based switching strategies can be found in, for example, Morse, F. M. Pait, and S. R. Weller's, "Logic-Based Switching Strategies for Self-Adjusting Control, *IEEE 33$^{rd}$ Conference on Decision and Control* (December 1994). It may be useful to categorize, logic-based controller-switching strategies into one of two approaches, generally identified as a prerouted controller based approach and a process model identifier and parameterized controller based approach.

Prerouted controller tuning, in principle, evaluates possible controllers contained in a predefined set of possible controllers. The evaluation is complete when a controller is identified that performs satisfactorily. Prerouted controller tuning systems are relatively simple to design and impose few requirements on controller structure. However, the advantages of prerouted controller tuning systems are overshadowed by intrinsically poor performance with respect to tuning time because an inordinate length of time is required to select the optimal controller from the predefined set.

Process model identifier and parameterized controllers generally include two or more parameter-dependent subsystems, including an identifier which generates an output estimation error, and an internal controller. In operation, a control signal, based on an estimate of a suitably defined model set, is communicated to a process being controlled. Identifier-based, parameterized controllers embody a controller-switching strategy based on the concept of "cyclic switching." Cyclic switching can be employed with or without providing an additional excitation signal to the process.

A worthwhile discussion of the cyclic switching approach to process control adaptation may be found in K. S. Narendra and J. Balakrishnan's, "Adaptive Control Using Multiple Models," *IEEE Transactions on Automatic Control*, Vol. 42, No. 2, pp. 177-187 (February 1997). The article discloses a process control system including a controller characterized by a plurality of parameters and N identification models operating in parallel and having model parameters corresponding to the plurality of controller parameters. At any point in time, a single model and corresponding parameterized controller is selected by a switching rule, and the corresponding control input is used to control the process. The identification models may be fixed parameter models or may be adaptive parameter models, depending on the requirements of the process, the needs of the operator and any other appropriate considerations. Fixed parameter model control systems offer a simple and effective means of insuring the existence of at least one model characterized by parameters sufficiently close to those of the unknown process.

Cyclic switching based process control systems using fixed parameter models provide for rapid adaptation speeds, but require the design and storage of a significant number of models within the process controller. Moreover, fixed models are capable of precisely representing only a finite number of process environments or conditions. To asymptotically improve process accuracy, an adaptive model must be employed.

Practically speaking, model based switching strategies pose a number of problems due to the significant number of models required for a reasonable process approximation. For example, a simple single-input, single-output (SISO) system, including a fixed model based self-tuner can reasonably be expected to include hundreds of fixed models in order to achieve satisfactory process performance. Thus, as systems become more complex, e.g., multivariable systems, the required number of customized, fixed models increases exponentially, thereby increasing the system setup time and system storage requirements. More effective solutions require consideration of the specific process model structure and controller type, and suggest the replacement of a simple switching strategy with more elaborate procedures.

A modified model-based approach for a Dahlin controller has been offered by Gendron in the text, "Improving the Robustness of Dead-Time Compensators for Plants with Unknown of Varying Delay," *Control Systems* 90 *Conference* (Helsinki 1990). The text discloses a simple first-order-plus-dead-time process model for providing process adaptation based on dead time variation. Rather than relying on simple model switching, the controller utilizes a process model based on the weighted sum of a set of models characterized by disparate dead times. Each of the models in the set generates a prediction of the process output, and the corresponding weight is adjusted automatically as a simple function of the prediction error. The basic concept has been extended to include process gain and dead time variation into the Dahlin controller construct.

In general, the prevalent approaches for designing an adaptive PID adaptive controller include the direct approach, and the indirect, or identifier-based approach. As discussed above, the identifier-based approach is effective for control systems utilizing switching strategies and provides an appropriate starting place from which to design an adaptive switching PID controller. It is known to provide an identifier-based, adaptive PID controller coupled with a Recursive Least Squares (RLS) estimator that tracks changes in the model parameters. Typical problems associated with recursive identifiers include difficulty selecting initial parameters, insufficient excitation, filtering, parameter wind-up, and sluggish parameter tracking speed. Because of the complexity of these variables and the difficulty associated with calculating accurate estimates, it is well understood in the art that the performance of the known identifier-based, adaptive PID controller may be improved by simplifying the process model.

An exemplary explanation of a simplified identifier based adaptive controller is described by Astrom and Hagglund in "Industrial Adaptive Controllers Based on Frequency Response Techniques," *Automatica*, Vol. 27, No. 4, pp. 599-609 (1991). Generally, this article discloses a controller designed to perform process model adaptation in the frequency domain, and tuning in response to set-point changes and natural disturbances. More specifically, a tuning frequency is selected by applying band-pass filters to the process input and output, the frequency of the filters is defined by the auto-tuner (tuner-on-demand). The auto-tuner defines the ultimate period using a relay oscillation technique prior to adaptive tuner operation and defines the process gain for the tuning frequency using a simplified RLS estimator. The auto-tuner has the capability to track changes in a process gain. However, when a change in a dead time or in a time constant is encountered, the point tracked no longer exhibits a $-\pi$ phase which is required for accurately estimating the ultimate gain and the ultimate period, and controller tuning therefore becomes less reliable.

Further, it is known to improve tuning by applying several tuning frequencies and using an interpolator to define a frequency with phase $-\pi$. Alternatively, it is possible to apply a single tuning frequency and adjust frequencies after each tuning cycle to track a phase $-\pi$. Both tuner models accommodate subsequent set-point changes and natural disturbances and may inject external excitations at the controller output or at the set-point input. Although such auto-tuners do not exhibit the size and set-up constraints of the previous technique, they are significantly more complex.

Furthermore, both tuner models utilize primitive adaptive models that recognize only two parameters, namely, ultimate gain and ultimate period. Tuner models incorporating these simple, two-parameter, adaptive models are suitable for Ziegler-Nichols tuning or some analogous modification, but are unsuitable for applications where Internal Model Control (IMC) or Lambda tuning is preferred. While a simple RLS identifier may be used to determine static gain for the feed forward control, the RLS identifier approach does not provide the process feedforward dynamics required for adequate feedforward control. In addition, because feedforward signals are load disturbances, and perturbation signals cannot be injected into the feedback path, the approach suffers the problem of insufficient excitations.

An alternate solution to feedforward adaptation was disclosed by Bristol and Hansen in U.S. Pat. No. 5,043,863, entitled "Multivariable Adaptive Feedforward Controller." This patent discloses a differential equation based process model designed to include load disturbances. The process model is periodically updated based on measured process data, wherein disturbances are characterized by moment relations and control relations that are achieved by projection methods. In general, the derived solution is very complex and requires significant excitations, much the same as the above-described RLS identifier approach. Moreover, the derived solution is suitable only for feedforward control and is inapplicable to an adaptive controller with feedback.

SUMMARY

An adaptive controller performs continuously scheduled process model parameter interpolation to determine a particular set of process model parameters which are used to develop controller tuning parameters for controller tuning, to thereby address various shortcomings of known adaptive control methods. Specifically, the adaptive controller described herein is capable of providing a uniform solution for feedback and feedforward adaptive PID control tuning which works well over a wide range of process operating points. Salient objectives addressed by an adaptive feedback/feedforward PID controller disclosed below include shorter adaptation time, minimization of constraints imposed on the use of PID tuning rules, simplicity of design, and attainment of adaptation with a reduction in process excitation.

More particularly, a state-based, adaptive PID controller described herein uses a new technique to determine an appropriate process model to be used to perform adaptive tuning over the various operating regions of the plant, and more particularly, uses a process model parameter determination technique that enables continuously scheduled, process model parameter update over the various plant operating regions or points. The use of this continuously scheduled process model parameter update method provides for smoother transitions between tuning parameters used in the PID controller during adaptive tuning procedures which are implemented based on changes in the operating region or the operating point of the process, thereby providing for better overall control.

Generally, a state-based adaptive PID controller described herein uses a set of process model parameters to determine a set of controller tuning parameters for controlling the process. During operation, the adaptive controller adaptively determines an appropriate set of process model parameters by first establishing a predefined set of process models for the process, wherein each of the process models corresponds to a different process operating region or process operating point, as defined by a state variable. The adaptive controller then uses these predefined process models during a tuning procedure to determine the particular process model (i.e., the particular set of process model parameter values) most applicable or accurate for the current operating point or region of the process plant, and uses these process model parameter values to tulle the controller. The process model parameter values may be determined on a process region basis, or may be determined on a continuously scheduled basis, based on the current operating point of the process as defined by a state variable.

To determine each of the predefined sets of process models, the adaptive controller periodically performs an adaptation routine which determines a particular set of process model parameters for a process model at a particular process operating point or region, also referred to as a knot location. In one case, a particular one of the predetermined process models may be determined by trying various different preset parameter values for the model to determine which set of such predetermined process model parameters provides the best modeling of the process based on process variable measurements. More particularly, during an adaptation routine, the adaptive controller may set each model parameter to a respective value that is selected from a set of predetermined initialization values corresponding to the model parameter. Evaluation of the individual models then includes a computation of a model-squared error, or norm. The norm may be assigned to every parameter represented in the model that is evaluated. As repeated evaluations of models are conducted, an accumulated norm is calculated for each parameter. The accumulated norm is the sum of all norms that have been assigned to the parameter in the course of model evaluations. Subsequently, an adaptive parameter value is calculated for each model parameter based on these norms. In one case, the adaptive parameter value may be a weighted average of the initialization values assigned to the respective parameters based on the norms computed for the parameter.

In this manner, various different process models may be determined for different values of a state variable and these process models may be stored. Thereafter, the specific process model that is to be used in tuning the process controller may be determined by interpolating between the process model parameter values for the different stored process models, based on the current operating point of the process (e.g., the current value of the state variable).

Another embodiment of the adaptive PID controller includes a system for tuning a process controller. The system may be implemented by either hardware or software, or any desired combination thereof. The system comprises a model set component communicatively coupled to a process and including a state variable, which defines a plurality of process regions or a plurality of process operating points, and a plurality of process models with at least one process model associated with each of the plurality of process regions or points. Each of the process models includes a plurality of model parameters, each model parameter having a value selected from a set of predetermined initial values assigned to the respective parameter. Each of the regions may include a set of standard parameter values defined for that region. An error generator is communicatively coupled to the model set component and to the process output. In one case, the error generator generates a model error signal representative of the difference between the output of the process model and the output of the process. A model evaluation component is communicatively coupled to the error generator for computing a model squared error corresponding to the process model for attributing the model squared error to parameter values represented in the model. A parameter interpolator is communicatively coupled to the model evaluation component for calculating an adaptive process parameter value for parameters represented in the process model. A controller update component has an input coupled to an output of the parameter interpolator and an output coupled to a controller. The controller update component updates adaptive controller parameter values to the controller upon conclusion of an adaptation cycle. The adaptive controller parameter values may be derived from the adaptive process parameter values that are calculated.

It will be understood that, depending on individual process requirements, not all process parameters will be subject to adaptation in a given adaptation cycle. Limited adaptation may be desired when there is reason to believe that only one, or at least not all, the process parameters have changed. For example, empirical evidence may show that, in a given time period (e.g. the elapsed time between adaptation cycles), the process gain parameter may vary while the remaining parameters may remain substantially constant. In this scenario, a process supervisor may initiate a limited adaptation cycle by causing only the process gain parameter to be adapted. The process controller is then updated in response to the adapted process gain parameter. The feedback/feedforward controller may also perform a method of adaptive controller whereby, as above, a model set is compiled for the process, and each of the models is evaluated by determining a unique model squared error for each model. An adaptive (e.g., gain) parameter value is calculated based on the weighted sum of each of the predetermined initialization parameter values. The initialization values are weighted by normalized fitness factors. With an adaptive process (e.g., gain) parameter calculated, the controller is updated or tuned accordingly.

In one embodiment, during a tuning procedure, the adaptive controller first determines a set of process parameter values to be used to tune the controller based on the current value of the state variable. During this process, the adaptive controller may use the state variable to determine a region at which the process is currently operating and may obtain a set of model parameters based on a process model previously determined as being associated with or applicable to that region during an adaptation routine. Alternatively, the tuning procedure may determine the applicable process model parameters using a continuously scheduled parameter technique, in which the tuning procedure identifies a set of one or more previously determined process models or process model parameters determined for the state variable or for variables above and below the current value of the state variable and an interpolation function determined for points between those process models.

BRIEF DESCRIPTION OF THE DRAWINGS

FIG. 9A is a functional block diagram of a model set element operating within the adaptive feedback/feedforward PID controller of FIG. 9.

DETAILED DESCRIPTION

Figure 1:
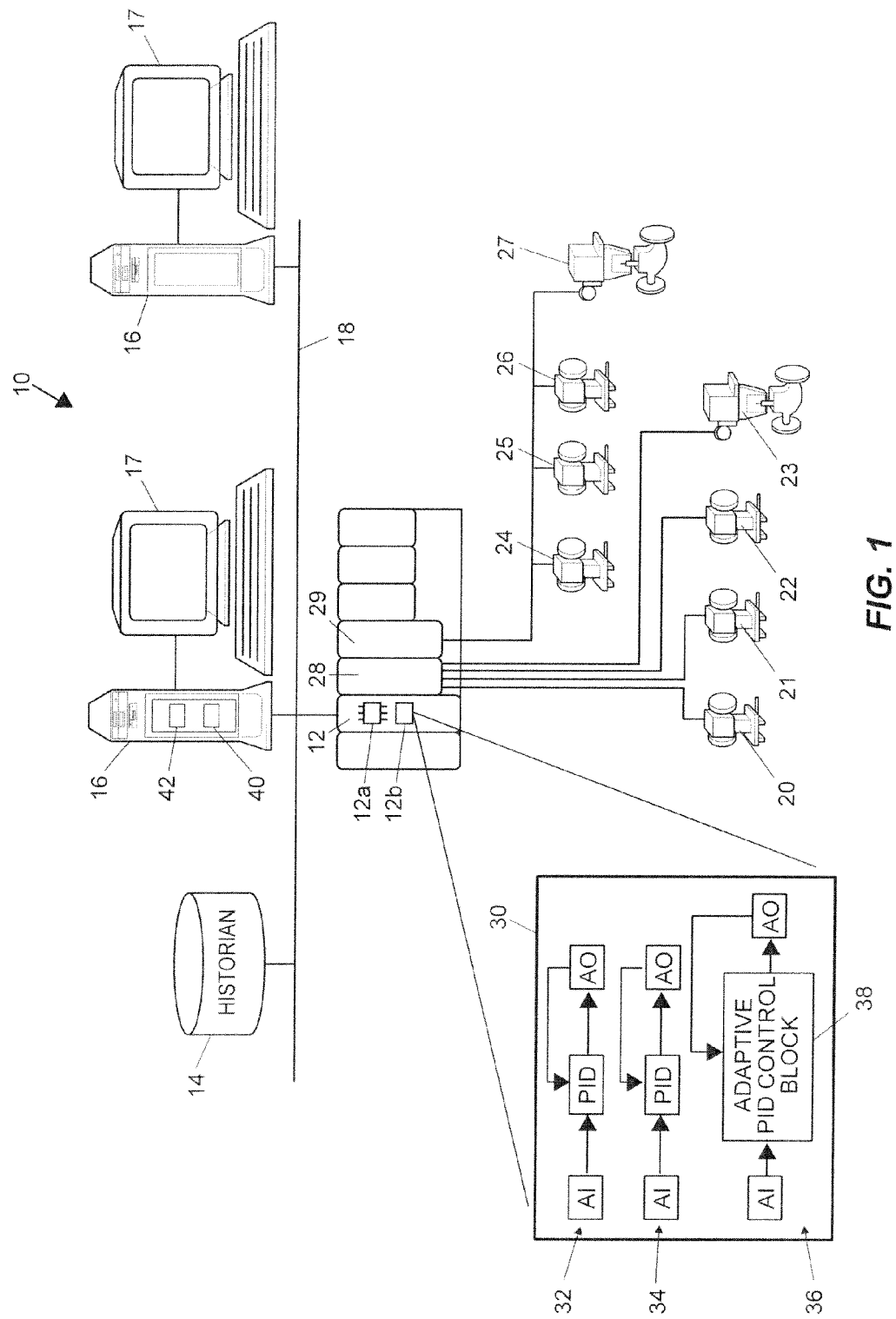
FIG. 1 is a schematic block diagram of an example process control system including an adaptive controller that uses regional or continuous process model parameter scheduling to perform adaptive tuning.

Referring now to FIG. 1, a process control system 10 for use in controlling, for example, an industrial process such as a refinery, a drug manufacturing process, a power plant, etc., includes a process controller 12 connected to a data historian 14 and to one or more host workstations or computers 16 (which may be any type of personal computers, workstations, etc., each having a display screen 17), via a communications network 18. The controller 12 is also connected to field devices 20-27 via input/output (I/O) cards 28 and 29. The communications network 18 may be, for example, an Ethernet communications network or any other suitable or desirable communications network while the data historian 14 may be any desired type of data collection unit having any desired type of memory and any desired or known software, hardware or firmware for storing data. The controller 12, which may be, by way of example, the DeltaV™ controller sold by Emerson Process Management, is communicatively connected to the field devices 20-27 using any desired hardware and software associated with, for example, standard 4-20 ma devices and/or any smart communication protocol such as the FOUNDATION® Fieldbus protocol, the HART® protocol, etc.

The field devices 20-27 may be any types of devices, such as sensors, valves, transmitters, positioners, etc. which perform a physical function within the process and/or which measure a process variable, while the I/O cards 28 and 29 may be any types of I/O devices conforming to any desired communication or controller protocol. In the embodiment illustrated in FIG. 1, the field devices 20-23 are standard 4-20 ma devices that communicate over analog lines to the I/O card 28 or are HART devices that communicate over combined analog and digital lines to the I/O card 28 while the field devices 24-27 are smart devices, such as Fieldbus field devices, that communicate over a digital bus to the I/O card 29 using Fieldbus protocol communications. Generally speaking, the Fieldbus protocol is an all-digital, serial, two-way communication protocol that provides a standardized physical interface to a two-wire loop or bus which interconnects field devices. The Fieldbus protocol provides, in effect, a local area network for field devices within a process, which enables these field devices to perform process control functions (using function blocks defined according to the Fieldbus protocol) at locations distributed throughout a process facility and to communicate with one another before and after the performance of these process control functions to implement an overall control strategy. Of course, the field devices 20-27 may conform to any other desired standards or protocols, including any wired or wireless standards or protocols, and any protocols now existing or developed in the future.

The controller 12 includes a processor 12a that implements or executes one or more process control routines, which may include control loops or portions of control loops, stored in a computer readable memory 12b, and communicates with the devices 20-27, the host computers 16 and the data historian 14 to control a process in any desired manner. It should be noted that any of the control routines or elements described herein may have parts thereof implemented or executed by processors in different controllers or other devices, such as in one or more of the field devices 20-27 if so desired. Likewise, the control routines or elements described herein to be implemented within the process control system 10 may take any form, including software, firmware, hardware, etc. A process control element can be any part or portion of a process control system including, for example, a routines a block or a module stored on any computer readable medium. Control routines, which may be modules or any part of a control procedure. Such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. As a result, it will be understood that the controller 12 may be configured to implement a control strategy or a control routine in any desired manner.

In one embodiment, the controller 12 implements a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 12, which is typically the case when these function blocks are used for, or are associated with standard 4-20 ma devices and some types of smart field devices such as HART and Fieldbus devices, or may be stored in and implemented by the field devices themselves, which can be the case with some types of Fieldbus devices. While the description of the control system is provided herein using a function block control strategy, the control strategy or control loops or modules could also be implemented or designed using other conventions, such as ladder logic, sequential function charts, etc. or using any other desired programming language or paradigm.

As illustrated by the exploded block 30 of FIG. 1, the controller 12 may include a number of control loops 32, 34 and 36, with the control loop 36 being illustrated as including an adaptive control routine or block 38. Each of the control loops 32, 34 and 36 is typically referred to as a control module. The control loops 32, 34 and 36 are illustrated as performing single loop control using a single-input/single-output PID control block connected to appropriate analog input (AI) and analog output (AO) function blocks, which may be associated with process control devices such as valves, with measurement devices such as temperature and pressure transmitters, or with any other device within the process control system 10. In the example system of FIG. 1, the adaptive control loop 36 includes the adaptive PID control block 38 which operates to adaptively determine and provide tuning parameters to a typical PID routine to adapt operation of the PID control routine during the on-line operation of the control loop 36 when controlling a process, e.g., when controlling the operation of a process using valves and/or other control devices which control a physical parameter of the process, based on measurement signals, such as sensor signals, which are indicative of measured or sensed parameters of the process. While the control loops 32, 34 and 36 are illustrated as performing PID control having an input communicatively connected to one AI function block and an output communicatively connected to one AO function block, the control loops 32, 34 and 36 could include more than a single input and a single output, and the inputs and outputs of these control loops may be connected to any other desired function blocks or control elements to receive other types of inputs and to provide other types of outputs. Moreover, the adaptive control block 38 may implement other types of control strategies, such as PI control, PD control, neural network control, fuzzy logic control, model predictive control or any type of feedforward/feedback control technique.

It will be understood that the function blocks illustrated in FIG. 1, such as the PLD function blocks and the adaptive PID function block 38, which itself can be implemented as one or more interconnected function blocks, can be executed by the controller 12 or, alternatively, can be partially or entirely located in and executed by any other suitable processing device(s), such as one of the workstations 16, one of the I/O devices 28 and 29, or even one of the field devices 24-27.

As illustrated in FIG. 1, one of the workstations 16 may include one or more adaptation support routines which are used to design, control, implement and/or view the adaptive control block 38 or the control loop 36. For example, the workstation 16 may include a user interface routine 40 that enables a user to input parameters to the adaptive PID control block 38 as described in more detail below, to start, stop and control the functioning of the adaptive control loop 36 or the blocks thereof, to provide setpoints and other adjustments to the control block 38, etc. Still further, the workstation 16 may include a routine or a block 42 that performs various adaptation functions as described in more detail below to perform continuous process model parameter scheduling as part of an adaptive control procedure.

Figure 2:
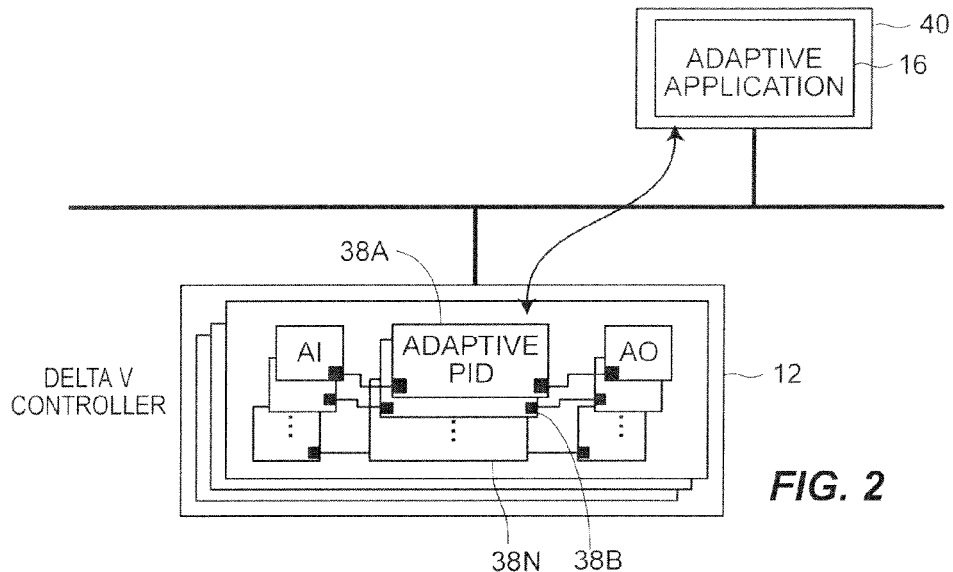
FIG. 2 is a schematic diagram illustrating interactions between an adaptive user interface application and one or more control loops including adaptive controllers.

As more particularly illustrated in FIG. 2, a user may use the interface routine 40 in one of the workstations 16 to set up, configure and download one or more adaptive control routines 38A . . . 38N into the process plant, and in particular, into one or more of the controllers 12. For example, the user may use the routine 40 to create and download multiple different adaptive PID control routines or loops 38A, 38B, . . . 38N, which can be run separately in different control loops or modules (either in the same or in different controllers) to implement adaptive control. While each of the routines or loops 38A-38N is illustrated in FIG. 2 as being stored and run (executed) in the same controller 12, these routines and the loops associated therewith could be executed or implemented in separate controllers 12, as well as in other devices, such as in field devices (e.g., in Fieldbus field devices).

Generally speaking, during runtime, each of the adaptive PID control routines 38A, 38B, etc., may implement a model switching technique to determine a set of values for one or more process model parameters (e.g., process gain, process dead time, process response time) at each of a set of different process operating points or regions, thereby defining multiple process models for the process. The process operating points for which process model parameters are determined may be defined by or associated with a particular value of a process state variable, which may be, for example, an input variable, a disturbance variable, an output variable, etc. The adaptive PID control block 38 will then use these various process models to perform PID controller tuning based on one or more tuning rules stored in and implemented by the adaptive PID control block 38. Of course, these tuning rules may be selected by a user during runtime or during configuration of the process control loop in which the adaptive PID controller block 38 is located (using the application 40).

More specifically, during operation of the process, the adaptive PID control block 38 collects process data (including one or more process inputs, outputs, disturbances, etc.) and, periodically or from time to time, performs an adaptation procedure on the stored data to determine a process model that is applicable for a particular process operating point or for a particular process operating region. The process operating point or region may be defined by or associated with a value or a range of values of a process state variable. The process model is then stored in a memory in the controller 12. Over time, a number of process models will be determined for different values of the process state variable. In some cases, a single process model may be determined and stored for each of a set of predefined process state variable regions. Alternatively, different process models may be determined and stored for predefined process state variable values over the entire possible range of the state variable. In a still further case, a maximum number of process models may be stored for different process state variable values, and, when the maximum number of process models has been determined, a previously stored process model may be culled or eliminated when a new process model is determined.

In any event, during a tuning procedure, the adaptive PID control block 38 determines an appropriate process model (e.g., an appropriate set of values for a set of process model parameters of a process model) to use to perform tuning based on the current value of the process state variable and the stored set of process models. The selected process model (and, in particular, the process model parameter values of this process model) are used by a tuning algorithm to determine a set of controller tuning parameters, which are then provided to and used by the control routine until a new tuning procedure is performed. In the case in which the adaptive controller implements a regional process model parameter scheduling technique, the adaptive PID controller determines the applicable process model parameter values as being the model parameter values stored for the particular process operating region in which the process is currently operating. The process operating region may be defined by the state variable value, for example. In the case in which the adaptive controller implements a continuous process model parameter scheduling technique, the adaptive PID controller determines the process model parameter values by interpolating between parameter values of a set of stored process models based on the current value of the process state variable as a stored interpolation function. Thus, in some cases, a separate set of process model parameters may be determined for each of a set of identified process regions while, in other cases, process model parameters may be continuously determined across the entire range or a portion of the range of the process state variable. The use of continuously scheduled process model parameters makes for smoother transitions between tuning parameters when the process changes operating states.

Figure 3:
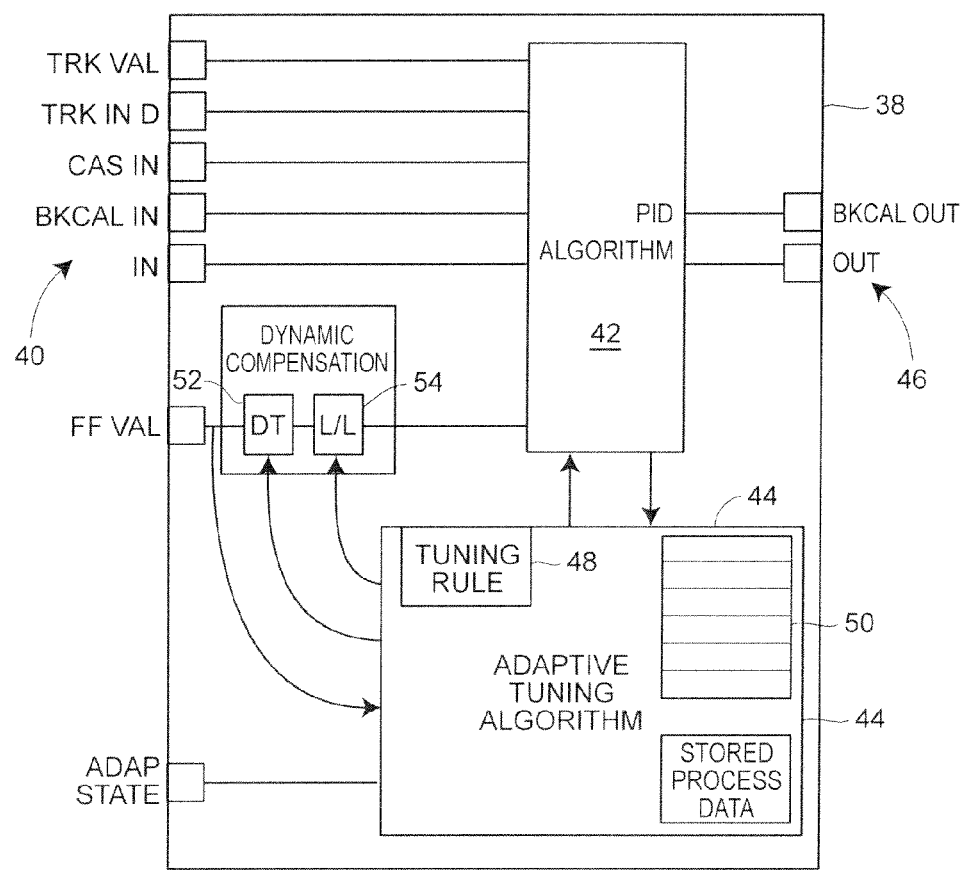
FIG. 3 is a schematic diagram of a example adaptive PID control block which uses regional or continuous process model scheduling to perform adaptive controller tuning.

FIG. 3 depicts a detailed example adaptive PID control function block 38 which may be used to implement the adaptive control technique described herein. The function block 38 of FIG. 3 includes a set of inputs 41 marked as TRK VAL, TRK IN D, CAS IN (a cascade input), BKCAL IN (a back calibrate input), IN (the process variable input), FF VAL (a feedforward value input) and ADAP STATE (an adaptive state variable input). As illustrated, most of the inputs 41 are connected directly or indirectly to a PID algorithm block or routine 42, while the ADAP STATE input is connected to an adaptive tuning algorithm block or routine 44, also referred to herein as an adaptive tuning block 44. The PID algorithm block 42, also referred to herein as a PID control block, may implement any desired PID control technique, including for example, a feedback/feedforward PID control technique. The PID control block 42 uses various of the inputs 41 as well as a set of controller tuning parameters developed by the adaptive tuning block 44 to produce a set of outputs 46. The outputs 46 illustrated in FIG. 3 include a control signal output (OUT) and a backcalibrate output (BKCAL OUT). However, other inputs and outputs could be used in the control block 38 if desired. Still further, while the PID control block 42 is illustrated and described herein as implementing a PID control routine, this block could implement other types of control instead, including for example, PI control, PD control, etc.

Generally speaking, the adaptive tuning block 44 periodically, or from time to time as initiated by a user or other non-periodic trigger, determines a set of controller tuning parameter values for use by the block 42, and provides these tuning parameter values to the block 42 during on-line control of the process plant. These tuning parameter values may be, for example, values for controller gain (K), integral time ($T_i$) and derivative time ($T_d$) used by the feedback PID control routine within the block 42. Of course, other tuning parameters may be used as well or instead depending on the type of control technique being implemented by the control block 42. The adaptive tuning block 44 includes one or more tuning rules 48 which may be, for example, selected by or configured by a riser or configuration engineer, to determine the manner in which tuning is to be performed based on a set of process model parameters. The tuning rules 48 may implement, for example, lambda tuning, Ziegler-Nichols tuning, IMC tuning or any other process characteristic based tuning methodology to determine a set of controller tuning parameter values from a set of model parameters that estimate or define the current state of the process.

As illustrated in FIG. 3, the adaptive tuning block 44 includes a storage unit 50 for storing various data, including process model parameter values, which may be, for example, determined in accordance with an adaptation technique described below. More particularly, different model parameter values may be determined for different operating points or regions of the process and may be stored in the memory 50. Thereafter, during a tuning procedure, one or more sets of the stored model parameters values may be used, along with the current value of the state variable, to determine a specific set of model parameter values that best define the process at the current process operating point. This determined set of model parameter values may then be used in a tuning operation to determine a set of controller tuning parameters to be provided to the controller. The memory 50 may also store user changeable data, such as an adapt enable parameter indicating whether the user has enabled the adaptive tuning capabilities of the control block 38.

As also indicated in FIG. 3, the controller block 38 may compensate the feedforward variable value (FF VAL) input into and used by the PID control algorithm block 42 based on the process model currently being used by the adaptive tuning block 44 to thereby provide better feedforward control response characteristics. In particular, feedforward compensation blocks 52 and 54 may used to dynamically compensate the feedforward signal which is used by the PID control block 42 to perform control. The compensation blocks 52 and 54, which are illustrated as a deadtime (DT) compensation block and a lead/lag (L/L) compensation block, respectively, may automatically implement feedforward tuning parameters and, in particular, may adjust the feedforward gain and the dynamic compensation elements used in the PID control block 42 based on the process model identified by the adaptive tuning block 44. Generally speaking, the adaptive tuning block 44 uses the process state input variable (ADAPT STATE) to initiate a tuning or an adaptation procedure and may use this variable to limit the range of parameter adjustments for a given operating region or point.

In one embodiment, when a control module that contains an adaptive PID control block 38 is downloaded to a controller 12, the parameters trended in the adaptive control block 38 will be automatically assigned to the historian (e.g., the historian 14 of FIG. 1). Standard PID behavior will be observed when the adaptive tuning parameters are at their default values (i.e., as set by the configuration engineer or an operator). However, when the adaptive control feature of the control block 38 is enabled (as defined by the adapt enable parameter in the memory 50) and when a user or configuration engineer has specified a time to steady-state, then the adaptive algorithm embedded in the control block 38 may update automatically after adapting the process model to change the PID controller feedback tuning parameters, such as the controller gain, the integral time (also called reset) and the derivative time (also called rate) parameters, and may change the PID feedforward controller tuning parameters, such as gain, lead, lag, and deadtime parameters, to provide the best control response based on the process model currently identified for the current operating region or operating point of the process. While, in some instances, the adaptive PID implementation can set the PID feedback and feedforward tuning parameters based on a process model associated with a current operating region of the process, in other instances, the adaptive PID implementation may enable the tuning parameters to be determined on a continuous basis, i.e., based on continuously scheduled process model parameters.

In all cases, however, the adjustments to the PID control block 42 will be based on a process model identified for the feedback path and the selected tuning rule or rules. A limited set of the tuning rules 48 may be embedded in the adaptive tuning block 44, and the particular tuning rule used at any time may be selected by the user through the adaptive user interface application 40 of FIG. 2.

In one embodiment, the adjustment to the feedforward controller gain, lead, lag and deadtime tuning parameters may be automatically set, based on the process model identified in the feedback and feedforward paths in the following manner:

Feedforward Lead=Time constant for change in the manipulated parameter in the feedback path (OUT)

Feedforward Lag=Time constant for change in measured disturbance in the feedforward path (FF VAL)

Feedforward Gain=−(KL/KM)*Modifier where:
KL=process gain for load disturbance input in the feedforward path
KM=process gain for manipulated input in the feedback path
Modifier=Constant with a value of 0.5 to 1. This value may be set by a user, for example.

Feedforward Deadtime=DT2−DT1

Where:

DT2=Deadtime for change in load disturbance in the feedforward path

DT1=Deadtime for change in manipulated input in the feedback path.

In one embodiment, the amount of adjustment that can be made by the adaptive tuning block 40 will be limited. For example, a default limit of 50% of the initial value, i.e., the value when adaptation was initially enabled, can be used for PID tuning and dynamic compensation parameters. When adaptive tuning is disabled, the PID and feed forward tuning can automatically be reset to their typical setting for the default operating range. If the user wishes to adjust the adaptation limits, the user may do so using the adaptation user interface application 40 by setting a typical value for the tuning parameters, and defining the processing associated with the state input parameters.

In any event, when enabled to perform adaptive control, the adaptive tuning block 44 determines a set of model parameter values to use to perform tuning based on the current operating point or region of the process, which may be defined or indicated by the value of the state input variable (e.g., the ADAP STATE input of FIG. 3). A couple of different general methodologies of determining a set of model parameters based on a current value of the state input variable will be described below with respect to FIGS. 4-8. However, it will be understood that other methods may be used as well or instead to determine a set of model parameters which describe the process, and which are used according to the selected set of tuning rules to determine a set of tuning parameters for the PID control block 38.

Figure 4:
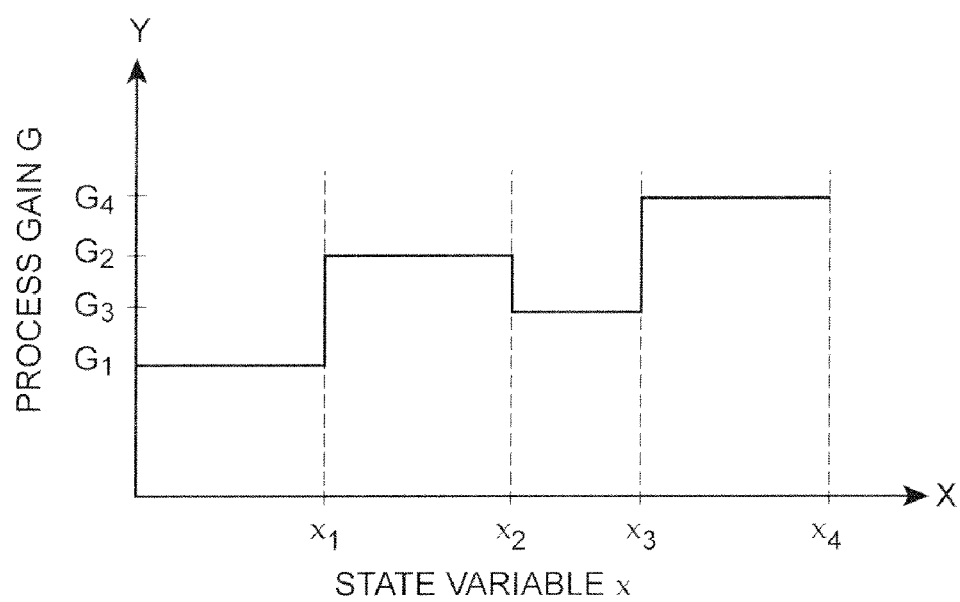
FIG. 4 is a graph indicating the manner in which model parameters may be determined on a regional basis in the controllers of FIGS. 1-3.

Generally speaking, the process models or process model parameters to be used in the tuning procedure described herein may be determined on a regional basis or on a continuously scheduled basis. When determined on a regional basis, a process model parameter value for each of the process model parameters is determined for a particular region of process operation, as defined by the process state variable value, and these process model parameter values are used whenever the process in within the specified region. The determination and use of the single set of process model parameter values for a given process region is useful when the process characteristics, e.g., the gain, the dead time, the response time, etc. remain the same throughout a particular region, and/or when the various process regions and the boundaries of these regions are easy to determine or specify. The use of regionally determined process model parameter values is illustrated in FIG. 4, which depicts a graph of the state variable along the x-axis versus a particular process model parameter value (process gain in this case), along the y-axis. In the graph of FIG. 4, five distinct process regions are illustrated with respect to the values of the state variable, with these regions being separated by dotted lines. Thus, as seen in FIG. 4, the process gain value (G) stays the same at all points (values of the state variable x) associated with a particular process region, but changes from region to region. In particular, the process gain value is $G_1$ at all values of the state variable below $x_1$, is $G_2$ at all values of the state variable between $x_1$ and $x_2$, is $G_3$ at all values of the state variable between $x_2$ and $x_3$, and is $G_4$ at all values of the state variable between $x_3$ and $x_4$. In this case, the process gain value is undefined for values above $x_4$. Moreover, as will be understood, the state variable regions need not be of uniform length. However, as will be understood from the discussion below, the value of the process parameter stored for a particular process region may change from time to time based on different runs of an adaptation procedure used to determine the appropriate value of this process parameter in the first place.

Unfortunately, in many cases, process characteristics (e.g., process gain, process dead time, process response time, etc.) can change quickly over relatively small changes in the state variable. In fact, in many cases, the values of the process gain, dead time, response time or other process characteristic may change or vary almost continuously over the range of a process state variable. In these cases, the use of adaptation based on process regions, as illustrated in FIG. 4, in not very effective. Instead, it is advantageous to enable the process model parameter values to vary continuously over the entire possible range of the state variable, so that the appropriate process model used for tuning purposes can also change continuously based on the current value of the process state variable. This technique is referred to herein as continuous process model scheduling. In these cases, the adaptive controller has the ability to obtain new process model parameters for each new operating point of the process, which enables the tuning system to provide better or more accurate tuning parameters for the PID controller in response to even minor or minimal changes in the value of the process state variable.

One method of implementing continuous process model scheduling (to thereby perform continuous scheduling of process model parameter values during process tuning) is to determine a set of process model parameter values (i.e., a process model) at each of a finite set of values for the state variable, and to interpolate between these model parameter values based on the actual or current value of the state variable. More particularly, and as described in more detail below, a number of different process models (each having a single value for each of a set of process model parameters) can be separately determined and stored, with each of the process models being associated with a particular value of the state variable. If desired, the process models for the particular state variable values can be determined using a model adaptation procedure described below with respect to FIGS. 9-11.

Figure 5:
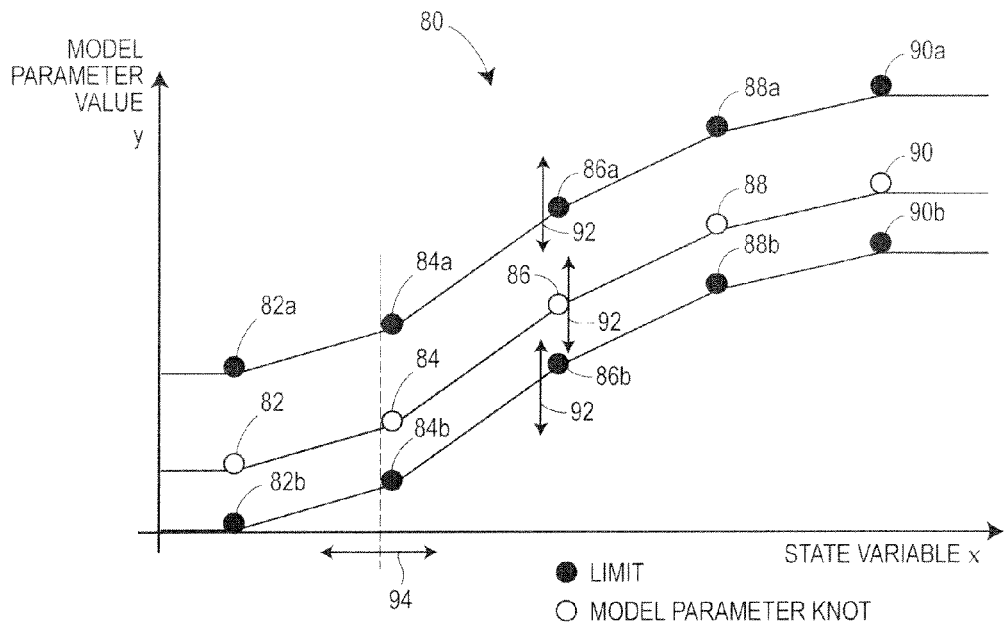
FIG. 5 is a graph illustrating a relationship between process model parameter values, as stored in a set of knots defining process models, and a process state variable for use in determining process models on a continuously scheduled basis.

In any event, for the sake of this discussion, each determined process model will be referred to as a "knot" or a known point in the state variable space. FIG. 5 depicts a graph 80 illustrating, for a single model parameter, five knots (82, 84, 86, 88, 90) determined for that model parameter for five different state variable values (depicted along the x-axis) across the range of the state variable space. It will be understood that similar knots may exist for the other model parameters with respect to the same or different state variable values, but are not shown in FIG. 5. Moreover, upper and lower limits associated with the model parameter at each knot are shown above and below the model parameter value as a solid circle. The upper limit is marked as an "a" value and the lower limit is marked as a "b" value. Thus, the upper and lower limits of the model parameter value at the knot 86 are marked as 86a and 86b, respectively. Generally speaking, the upper and lower limits associated with a knot define the maximum and minimum values that the process parameter may change to, either in one tuning cycle or over any number of cycles, to prevent or reduce the creation of widely varying tuning parameters from tuning cycle to tuning cycle. As noted above, the value of the model parameter at each particular knot (wherein each knot location is associated with a particular value of the state variable) may be determined by a process model adaptation procedure, and can thus change from time to time based on the results of different model adaptation procedures. This effect enables the tuning system to adapt to process changes which may be caused by varying conditions within the process, such as changes in ambient temperature, changes in humidity, degradation of equipment over time, etc. Moreover, the values of the model parameters at state variable values between the knot locations may be determined by interpolation techniques described in more detail below.

Using the concept of knots as described above, a nonlinear model characteristic definition may be implemented or used in the tuning procedure in which the model parameters (e.g., gain, dead time, time constant) for the process are determined non-linearly in dependence on the selected process state variable (which may be a process input, a process output or a computed value) and the values of the model parameters stored for predefined knots. In particular, the process model parameter values can be defined as a linear or a non-linear approximation using at least two knots connected by straight lines (as illustrated in FIG. 5), or more generally, by non-linear curves. Generally speaking, lines connecting the edges of the state variable range to the first knot at each end of the state variable range should be horizontal or flat, as no information is known in this region.

Importantly, the model parameter values at the determined knots can be changed (e.g., moved horizontally in FIG. 5) based, for example, on the results of a new model adaptation procedure for a knot. This effect is illustrated in FIG. 5 by the arrows 92 near the knot 86. Moreover, in some cases, the determined locations of the knots can change (e.g., moved vertically in FIG. 5) based on a model adaptation procedure. More particularly, the value of the state variable for which a knot is determined can vary or change over time. This effect is illustrated in FIG. 5 by the arrow 94 for the knot 84. However, when re-determining a knot, it is desirable to limit the amount by which a knot can be moved (either horizontally or vertically or both). For example, a rule may be instituted that the model parameter value of a knot cannot be moved beyond its limits (as shown in FIG. 5), or optionally beyond its neighbors limits in a single move, to reduce the fluctuation of the model parameter values during operation of the process. This restriction provides a safeguard to help assure controller tuning stability.

Generally speaking, the initial process model parameter interpolation curves defined between the knots may be flat, e.g., at the level of model parameter calculated for the initial tuning parameters. In this situation, the model parameters for a single determined knot will apply across a region of the state variable until more knots are determined. During operation of the process, additional knots are then determined and are stored for the process, and these additional knots affect or change the value of a model parameters used during a tuning procedure.

More particularly, it is possible, at the initialization of the tuning routine, to either (1) define a predefined number of, for example, equally spaced knots, and to allow either or both of the location and the model parameter values at the knots to be updated during adaptation or (2) create knots as the adaptation proceeds, up to a certain maximum number of knots, and then, after that point, update the knot locations and parameter values after each new adaptation. In both of these cases, a particular process model parameter for a particular value of the state variable is determined by interpolating between the process model parameter values of the stored neighboring knots with respect to the current process state variable value.

Figure 6:
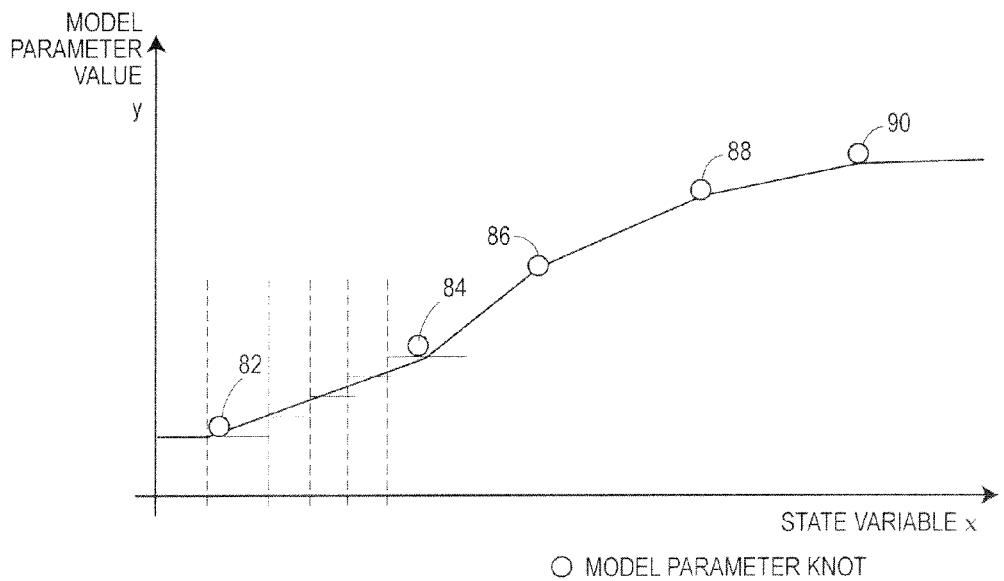
FIG. 6 is a graph illustrating a set of state variable subregions defined between a set of knots defining stored process models.

To avoid frequent changes in controller tuning, the lines or regions between any two adjacent knots may be divided into several (e.g., five) equal sections. Of course, the number of sections can be adjusted depending on, for example, the parameter gradient between the two adjacent knots (with a higher gradient typically leading to more sections), the distance between knots, etc. This concept is illustrated in FIG. 6, in which the space between the knots 82 and 84 is divided into five sections, as indicted by the dotted lines. Here, the default sections around the knots 82 and 84 are symmetrical and may be double in size (i.e., equally sized in both directions relative to the knot), while the other sections are equally spaced. When this type of grid is used, a new controller tuning procedure is only implemented when the state variable changes enough to go from one sub-section to another. This constraint, in effect, requires a change in the state variable greater than a minimal change to initiate a new controller tuning procedure, which prevents controller retuning in response to small changes or variations in the state variable value based on the use of an interpolation function between knot locations.

If desired, knot sections can be extended in both directions to accomplish better fit of an interpolating curve to the adaptive results. For example, the model parameter value at the first and the last knot sections of FIG. 6 stays constant from the knot location up to (or down to) the state variable limit. When the state variable enters a new section or sub-section, the adaptive controller determines new process model parameter values based on this section or sub-section, determines new controller tuning parameters based on these process model parameters values, and holds these tuning parameters constant until the state variable enters the next section or sub-section of FIG. 6.

Generally, it is desirable to configure the tuning system so that model parameter values at a knot are not applied or used in the tuning routine until at least one of the knots is marked as being adapted. In the case in which the state variable is between two knots, and only one of the knots is marked as adapted, the value of the adapted knot may be used in the tuning procedure. In the case in which a state parameter is between non-adapted knots, the value of the closest adapted knot on each side of the state variable value may be applied or used during the tuning procedure. This technique assures that the model parameter values for the closest adapted knot(s) are used in tuning when some or all of the knots have not yet received model parameter values based on an actual adaptation procedure.

Importantly, a particular adaptation procedure will use data obtained over a certain range of the state variable. While this range may include one or more knots, the data will typically be collected for state variable values that are not coincident with the knots. More particularly, process variable measurements (inputs, outputs, disturbance parameters, etc.) used in any particular adaptation procedure will be measured for or will be associated with various different values of the state variable. However, the result of any particular adaptation procedure is treated as being associated with only one state variable point. One manner of determining a particular state variable point for which the results of an adaptation procedure are to be associated is to use the middle state variable value, i.e., the mid-point between the highest and lowest state variable values recorded during or used in the adaptation procedure. In this case, the state parameter value of a particular knot, as developed by an adaptation procedure run, may be determined as:

$$x_s = (\max(s_i) - \min(s_i))/2$$

Wherein:
  $x_s$ is the state variable value associated with the adaptation result;
  $s_i$ are state parameter values used during the adaptation procedure.

Of course, other manners of determining the state variable value associated with a particular adaptation procedure may be used as well, including for example, the average state variable value, the median state variable value, etc.

If desired, the following procedure may be used to update model parameters as a result of an adaptation procedure.

(1) If an adaptation state parameter defined during adaptation is at an existing knot or in close proximity to an existing knot, then the model parameter value(s) at the knot is/are updated with the adaptation result. Thereafter, model parameter values between neighboring knots are determined using an interpolating function applied using the updated knot parameter values.

(2) If the adaptation state parameter value is between two knots, then the model parameter values at the closest knots are updated using the newly adapted model parameter values, and the model parameter values at the state variable values between the knots are updated or determined using an interpolating function.

(3) When an alternative flexible knot location approach is applied, every adaptation procedure defines a knot location and the model parameter values at the knot are stored until a maximum number stored knots is achieved. After that time, when a new adaptation procedure occurs, the new adaptation procedure defines a new knot, and the existing set of the knots is pruned or culled by removing, for example, one old knot. The knot selected for removal may be selected based on any number of criterion, including the model quality at the knot, the time when model at the knot was adapted (i.e. the model "age" at the knot), and the proximity of a knot to the other knots. In the last case, it is typically more desirable to prune a knot in an area where there is a higher concentration of knots, rather than in an area where there is a lower concentration of knots. In the cases defined by alternatives (2) and (3) above, it may be desirable to define a function which moves the knots to improve the fit of a connecting line to the new adaptation result between knots.

Figure 7:
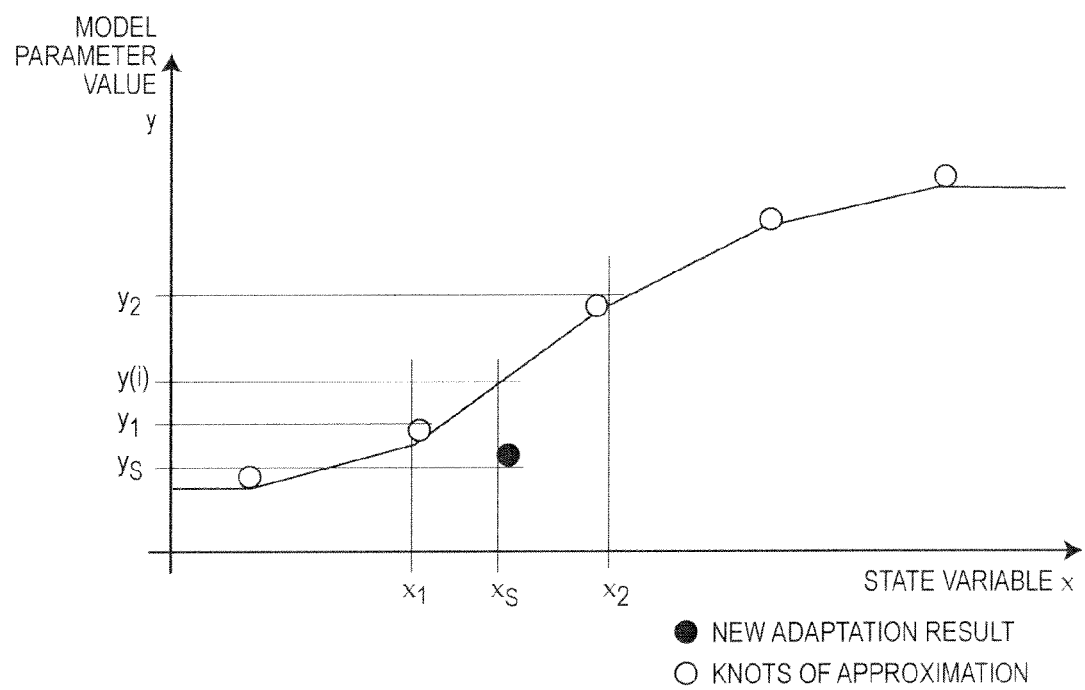
FIG. 7 is a graph illustrating a manner of integrating a newly adapted knot into a set of previously stored knots using parameter interpolation.

One method of updating knot locations or process model parameter values at particular knot locations, as well as defining an interpolation function to use between knots, is illustrated in FIG. 7. In FIG. 7, a model parameter value $y_S$ is determined for a new knot location $x_S$ which is between two other existing knot locations $x_1$ and $s_2$. In this situation, the new knot information may be used to update or change an interpolation function to be used to determine model parameter values between the knot locations $x_1$ and $x_2$ and/or to update or change the model parameter values stored for the knots $x_1$ and $x_2$. In particular, to update the interpolation function to use between the knots $x_1$ and $x_2$ and to update the existing model parameter values $y_1$ and $y_2$ stored for the knots $x_1$ and $x_2$ based on the new knot result $y_S$, the difference between the model parameter value $y_S$ at the new knot location and the interpolated value $y(i)$ for the model parameter at the new knot location is determined. This difference may then be used to determine a new interpolating curve may be used between knots $x_1$ and $x_2$ to get a better fit for the adapted value as well as to change the stored values for $y_1$ and $y_2$ at knots $x_1$ and $x_2$ to get a better fit for the data.

Here $y(i)$ may be determined using a linear interpolating curve which defines a straight line between the two knot points $[x_1, y_1: x_2, y_2]$:

$$y(i) = y_1 + \frac{y_2 - y_1}{x_2 - x_1}(x_s - x_1)$$

Where:
  $x_1$, $x_2$—closest knots location or alternatively position of the section edges between knots,
  $x_S$—new adaptation state variable value;
  $y_1$,$y_2$—model parameter value at the knots $x_1$ and $x_2$;
  $y(i)$—interpolated parameter value between knots $x_1$ and $x_2$; and
  $y_S$—adapted model parameter value between knots.

Figure 8:
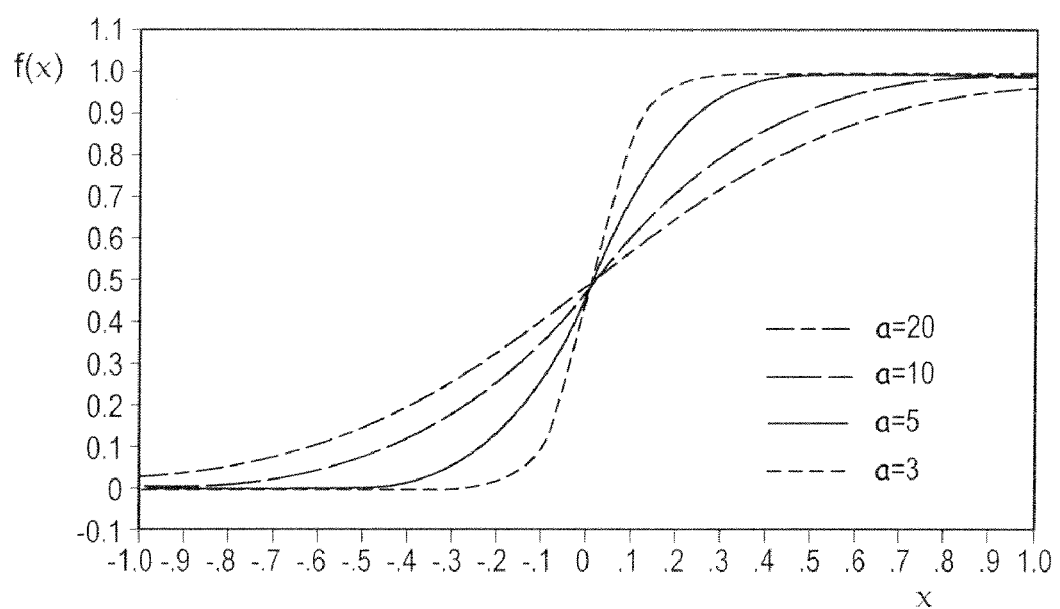
FIG. 8 is a depiction of different values of an interpolation function which may be used to determine process model parameters between a stored sets of knots.

As an alternative, a non-linear interpolation sigmoidal function may be used to provide a better fit. A generic form of sigmoidal function is:

$$f(x) = \frac{1}{1 + e^{-ax}}$$

where a is a parameter that defines the function shape. For values of $a \leq 3$, $f(x)$ is very close to linear interpolation, and for values of $a > 3$, the sigmoidal function is clearly non-linear as illustrated in FIG. 8. For interpolating model parameters values between knots, the sigmoidal function may be expressed in the form:

$$y(i) = y_1 + \frac{y_2 - y_1}{1 + e^{-a(x_s - b)/(x_2 - x_1)}}$$

A value a between $3 < a < 20$ adjusts well for wide degrees of non-linearity. Here, $$b = \frac{x_2 - x_1}{2}$$

and the difference between the adapted and the interpolated value is:

$$\Delta y = y_s - y(i)$$

Fitting this curve to the data, i.e., determining the best value of a to decrease $\Delta y$, can be performed by solving a set of least square linear or non-linear fit equations. However, executing this functionality in the control block is typically too complex for the process controller computing resources, as it takes excessive time and computations. It is possible, however, to use one or more simplified techniques to improve interpolation fit.

In one such simplified method, two adjustments may be accomplished sequentially to get a better fit. The first adjustment is performed for non-linear fit by changing the parameter a of the interpolating function as follows:

$$a^{new} = \max\{a + \text{sgn}[\Delta y(x_s - b)]^* \lambda, 3\}$$

where $\lambda$ is an adjustable filter factor and is $0 < \lambda < 1$ and where finally:

$$a^{new} = \min\{a^{new}, 20\}$$

After the first adjustment, the fit is validated if $|\Delta y| \leq \Delta y_{min}$ and, otherwise, the second adjustment is performed, in this procedure, $\Delta y_{min}$ is set heuristically, usually to about 5-10% of the model parameter value. The second adjustment is performed for linear and non-linear fit if the first step was not sufficient. After determining the value of $a^{new}$, the model parameter values at the adjacent knots may be recalculated as follows:

$$y_1' = y_1 + \Delta y \frac{x_2 - x_s}{x_2 - x_1} \lambda$$

$$y_2' = y_2 + \Delta y \frac{x_s - x_1}{x_2 - x_1} \lambda$$

Optionally, interpolation may be applied to change the section size at the knot, both for linear and non-linear adaptation. The section size changes at the knot location are accomplished in such a direction to bring the interpolating curve closer to the adapted value at the new state variable location. Of course, other manners of determining new interpolation functions and knot location values can be used as well.

While FIGS. 5-8 illustrate the storage and use of a set of knots determined for a particular process model parameter, in this case process gain, it will be understood that a similar set of knots can or will be determined and stored for each of the other process model parameters of the process model being used to perform controller tuning. Thus, for example, a set of knots (with associated model parameters values) similar to those illustrated in FIGS. 5-8 for the process gain model parameter can be determined for each of the other process model parameters being used in the tuning routine, such as process deadtime and process time constant. Moreover, while process model parameter values may be stored for each of the process model parameters at the same knot locations (i.e., at the same state variable values), the knots for each of the different process model parameters may alternatively be determined and stored separately and may thus be determined for different process operating points for each of the different process model parameters. Thus, the process gain knots may be determined and stored at a first set of process operating points, while the process deadtime knots may be determined and stored for a different set of process operating points, while the process time constant model parameters may be determined and stored for a still different set of knot locations. Still further, the process model determination step described herein may be preformed at any particular time for one or for more than one of the process model parameters. For example, new process model parameter values may be determined for two or more of the process model parameters based on a single set of process data and thus for the same process operating point, or new values for one process model parameter may be determined separately from or using different data than another process model parameter, allowing the values for these different process model parameters to be determined at different knot locations (i.e., at different process operating points).

Figure 9:
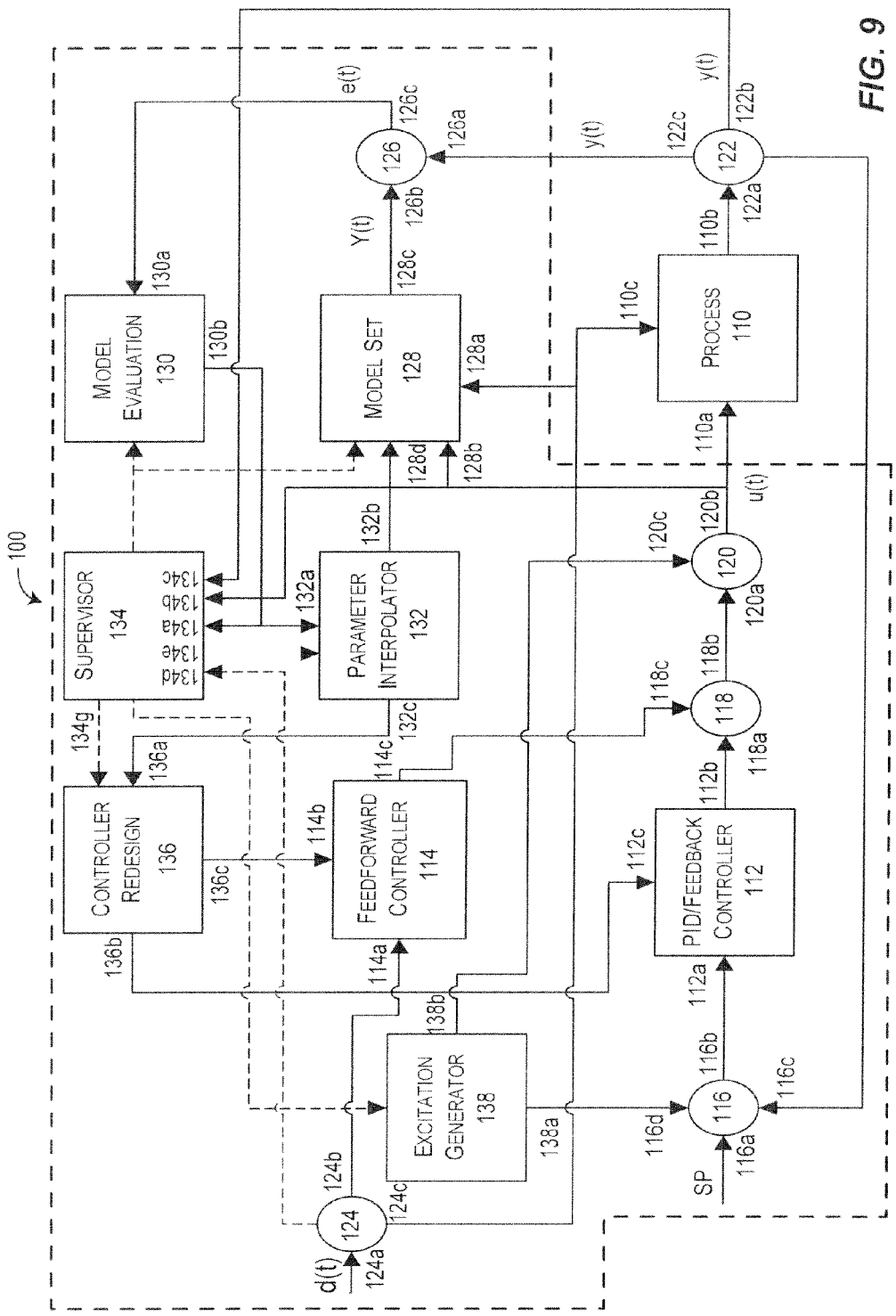
FIG. 9 is a functional block diagram of an adaptive feedback/feedforward PID controller, the operation of which is based on interpolation of process model parameters.
Figure 10:
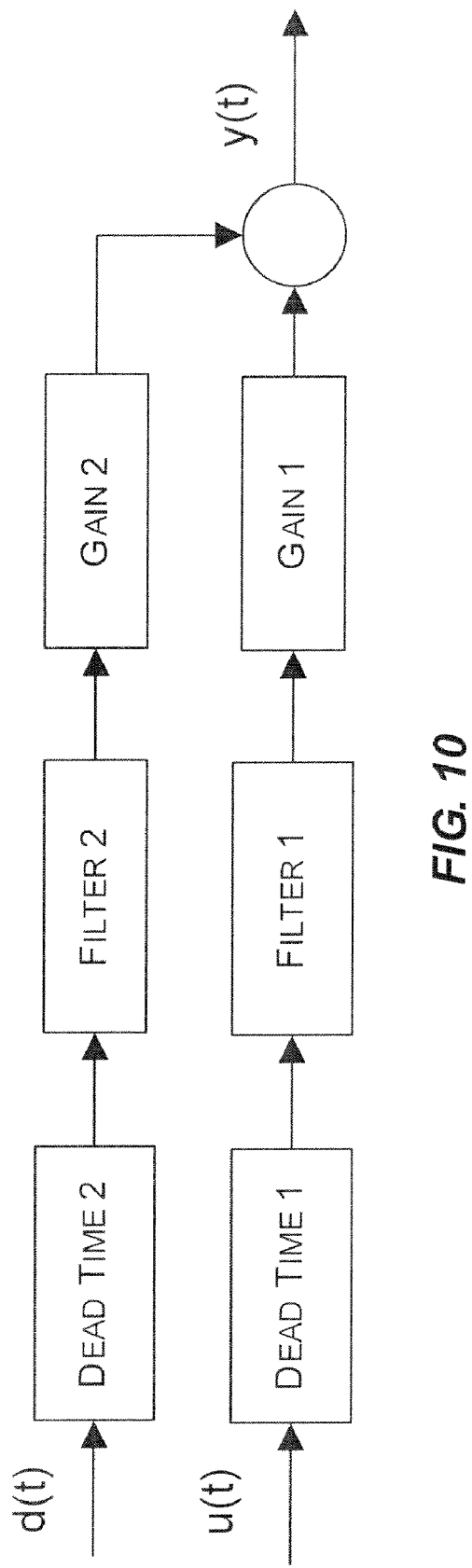
FIG. 10 is a conceptual depiction of a first-order-plus-deadtime process model that includes both feedback and feedforward loops.
Figure 11:
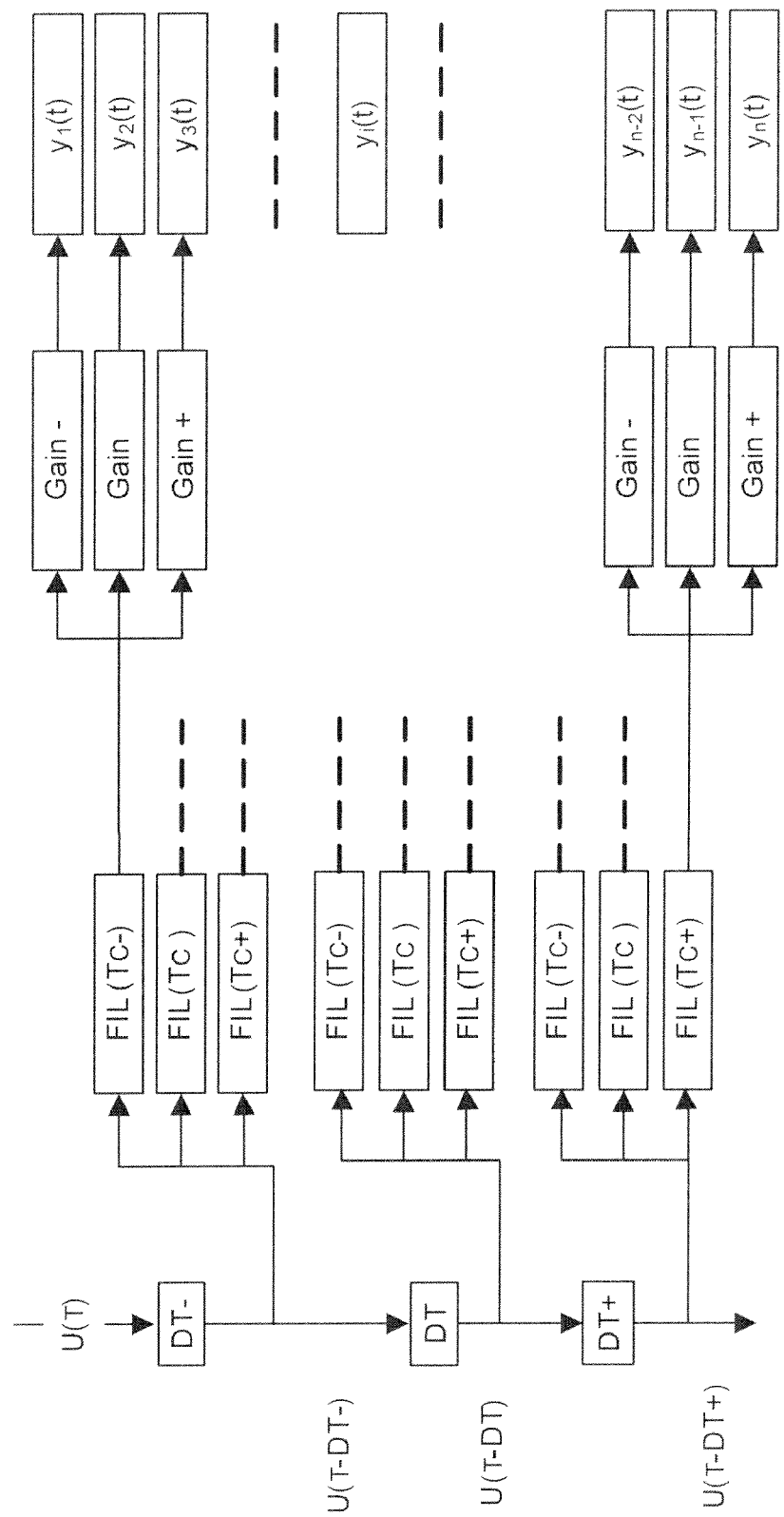
FIG. 11 is a depiction of a model set characterized by three parameters, DT, Tc and Gain, each of which may assume one of three values and depicts a suggested sequence in which to conduct a model scan.

FIGS. 9-11 illustrate an adaptation methodology and system which may be used to quickly determine a set of model parameters describing the operation of a process at a particular operating point or operating region of the process, as defined by the state variable. In particular, FIG. 9 illustrates an exemplary adaptive feedback/feedforward (FB/FC) PID controller 100 used to control a process 110. The general operation of a feedback/feedforward (FB/FC) PID controller is well known by those skilled in the art. See, for example, F. G. Shinskey, Process Control Systems: *Application, Design and Tuning*, 4$^{th}$ ed., McGraw-Hill, New York, 1996. More particularly, the adaptive controller 100 illustrated in FIG. 4 (which may be implemented in whole or in part by the control block 38 of FIG. 3) includes a PID controller 112 incorporating a feedback (FBC) controller, and a separate feedforward (FFC) controller 114. These two elements may be implemented by the PID control block 42 of FIG. 3.

The process controller 100 may be conveniently described with reference to an FBC input node 116, an FBC output node 118, a process input node 120, a process output node 122, a feedforward controller (FFC) input node 124, and an error node 126. In a manner familiar to those skilled in the art, a process set-point signal SP is applied to a first input of the FBC input node 116, indicated by the numeral 116a. An output 16b of FBC input node 116 is coupled to an input 112a of the PID controller 112. An output 112b of the PID controller 112 is coupled to a first input 118a of the FBC output node 118. An output 118b of the FBC output node 118 is coupled to a first input 120a of the process input node 120. An output 120b of the process input node 120 is coupled to a first input 110a of the process 110. An output 110b of the process 110 is coupled to an input 122a of the process output node 122. A first output 122a of the process output node 122 is fed back to a second input 116c of FBC input node 111. A second output 122c of process output node 122 is coupled to a first input 126a of the error node 126. FIG. 9 further illustrates the input signal to process 110 which can be, for example, referred to as u(t), and the output signal of process 110 which can be referred to as y(t). Strictly speaking, u(t) and y(t) are electrical representations of the physical phenomena that arise in connection with the process. In addition, a disturbance signal, d(t), appears at an input 124a of the FFC input node 124. The disturbance signal d(t) is coupled from a first output 124b of the FFC input node 124 to an input 114a of the FFC 114 and propagates from a second output 124c of the FFC input node 124 to a second input 110c of the process 1116. An output 114c of FFC 114 is coupled to an input 118c of the FBC output node 118. The disturbance signal may be, for example, the feedforward signal (FF VAL) of FIG. 3.

The format and layout of the exemplary feedback/feedforward PID process control system described above will be well understood by a person of ordinary skill in the art. The additional functional components illustrated in FIG. 9 describe an exemplary adaptive feedback/feedforward PID controller, which may be implemented within the adaptive tuning block 44 of FIG. 3, for example. Specifically, a model set component 128 includes signal inputs 128a and 128b respectively coupled to the disturbance signal d(t) and to process input signal u(t). The constituents of the model set component 128 are a set of mathematical models representative of the process 10. The output 128c of the model set component 128 is coupled to the input 126b of the error node 126. An output 126c of the error node 126 is coupled to an input 130a of a model evaluation component 113). The model evaluation component 130 includes a simulator (not shown), which may be a software program, that simulates the process 110, as defined by the process parameter values delivered by the model set component 128. The model evaluation component 130 further includes a centering routine (not shown) to calculate and compensate for a parameter estimate offset by defining a numerical offset and recentering the models used in the next evaluation based on the numerical offset. An output 130b of the model evaluation component 130 is coupled to an input 132a of a parameter interpolator component 132 and to an input 134a of a supervisor component 134. An output 132b of parameter interpolator 132 is coupled to an input 128d of the model set component 128, and an output 132c of the parameter interpolator 132 is coupled to an input 136a of a controller update component 136. The controller update component 136 has a first output 136b coupled to a second input 112c of the FBC 112 and a second output 136c is coupled to an input 114b of the FFC 114. An in-depth description of the operation and significance of the components 128, 130, 132, 134 and 136 follows.

In operation, the exemplary adaptive feedback/feedforward PID controller, including the components 128, 130, 132, 134 and 136, operates generally as discussed below. The adaptive feedback/feedforward PID control system is mathematically described by a model in the model set 128. Each individual model in the model set 128 is defined by predetermined parameters intended to replicate, in a limited fashion, the process 110. In general, each of the models within the model set 128 may be defined by a number of parameters, m, and each of the parameters may be assigned a number of values, n. Therefore the total number of models in the model set 128 is equal to N, where $N=m^n$. In an exemplary embodiment, the models may be characterized by the parameters dead time (DT), time constant (Tc) and gain. Furthermore, in one example, each of the parameters will be assumed to have been assigned one of three values: Dead Time=DT+, DT, DT−. Time Constant=Tc+, Tc, or Tc−; and Gain=Gain+, Gain, and Gain−. Therefore, the total number of models available to mathematically approximate the process 10 is $N=3^3=27$. Each of the models will be individually referred to as $Mod_i$, where i=1, . . . , 27.

At, or prior to, the initiation of a model evaluation scan (also referred to herein as an adaptation procedure), the parameter interpolator 132 provides a set of predetermined initialization parameter values to the model set component 128. Again, if three parameters, DT, Tc and Gain are assumed, and if each of the parameters has three predetermined initialization parameter values, the parameter interpolator 132 will provide nine parameter values to the model set component 128. Parameter values may be established in any known manner, and at the discretion of the controller design. In general, the model parameter values written to the model set 128, at the beginning of an adaptation cycle, are based on the adaptive parameter values computed during the most recent adaptation cycle. In response to the nine parameter values, and under the control of the supervisor 134, the model set component 128 constructs a total of 27 models, $Mod_i$, where i= 1, . . . , 27. The supervisor 134, during the model evaluation scan, sequentially selects and activates a model $Mod_i$, and applies the process input u(t), received via the input 128b, to the activated model $Mod_i$. The resultant output of the activated model $Mod_i$ is then communicated to the error generator node 126 via the model set output 128c.

FIG. 9A graphically illustrates an exemplary model set 128 including a state variable $S_i$ which, as described in more detail below, may be configured to include a plurality of regions or may represent a particular value of the state variable. The state variable $S_i$, where i=1, . . . , n and n identifies the number of defined states, represents the measured process disturbance descriptive of the gain or dynamics associated with the measured process input-output. The state variable $S_i$ is generally based on process variables which may be, among other things, a change in the disturbance signal d(t), the set-point SP, a signal generated by an excitation generally 138, and/or any other process input or output. The state variable $S_i$ may be developed within a state development routine operating within the model set 128 as a function of one or more of the process variables d(t), u(t), y(t), Y(t), e(t) and SP. It should be noted that the state development routine may be executed in any component or sub-component of the control system as long as the routine has access to the stored or real-time process variable of interest. The state variable $S_i$ may further be predetermined or include user-defined values assigned to generally describe a range or region into which the models $Mod_i$ may be grouped.

When divided into regions, the region defined by the state variable $S_i$ may include a plurality of initial model parameter values predetermined to characterize the typical operation of the region. The defined region, during the controller design procedure, may be established to insure that the model $Mod_i$ remains substantially constant throughout the range of the state variable. In operation, and prior to beginning an adaptation cycle, when the measured process disturbance changes from a first state (e.g., $S_1$) to a second state (e.g., $S_2$) the parameter values associated with state $S_1$ may be immediately exchanged with the parameter values associated with state $S_2$. Applying those model parameter values to retune the PID controller increases the performance of the PID controller 12 and/or the feedforward controller 14 in a particular region.

Figure 9B:
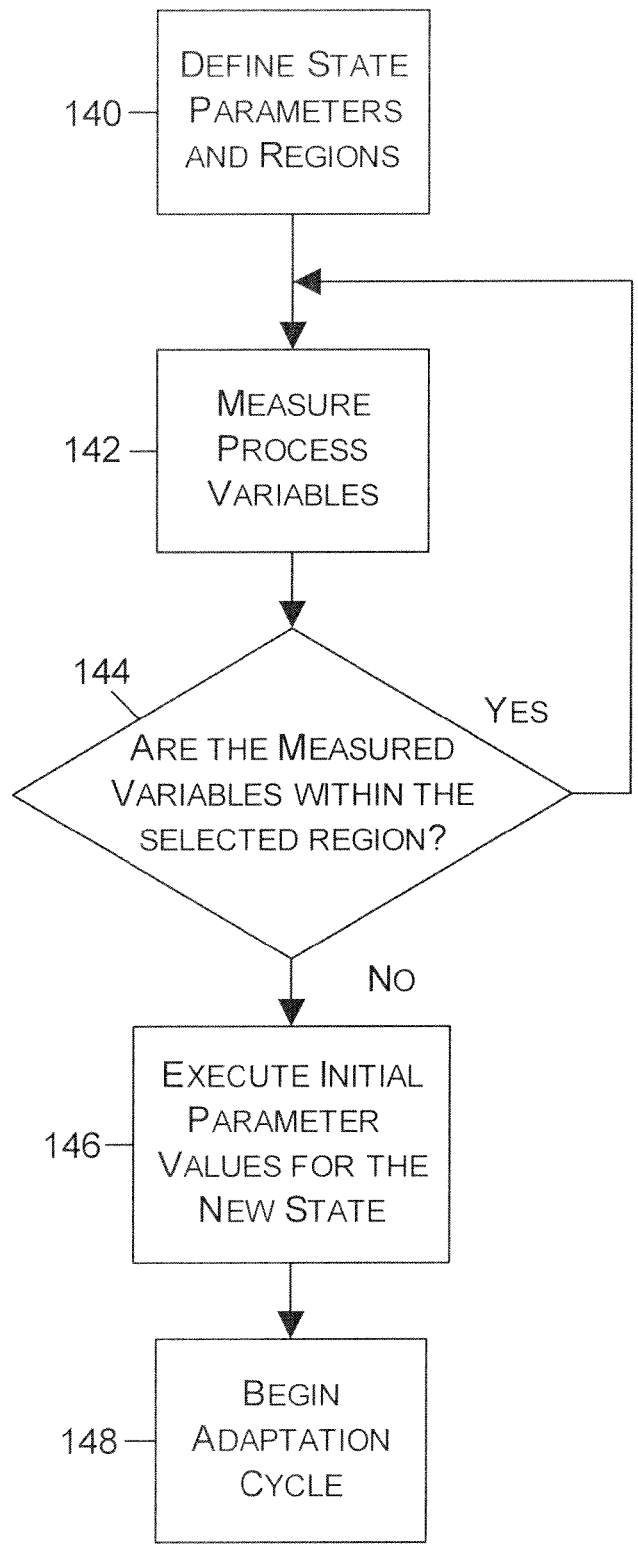
FIG. 9B is a flow diagram of an embodiment of an adaptive feedback/feedforward PID controller.

FIG. 9B illustrates an exemplary flow diagram of the operation of the adaptive feedback/feedforward PID controller. As discussed above, during the initial set-up and design of the controller, the range of the state variable $S_i$ can be defined, as shown in a block 140. The total state range can be thought of as the range in which the change in the process variable or the measured disturbance input can be expected to experience. The range $S_i$, in turn, is a region of the total range in which the process model is determined to be substantially constant or predictable. The change in the disturbance input, caused by the excitation generator 138, the disturbance signal d(t) and/or the set-point SP is then measured, as shown in a block 142. As shown in a block 144, the measured change in the process variables is then compared to the current range $S_i$ to determine if the disturbance input is within the selected region. If the disturbance input is within the selected region, the process continues to measure the change in disturbances. However, if the disturbance input is within a new range $S_j$, then the initial parameter values for that state $S_j$ are loaded and used by the feedback controller 112 and/or feedforward controller 114, as shown in block 146.

The initial or typical parameter values defined for each range or state $S_i$ may be based on the average parameter values measured or calculated within the range or they may be manually input by a controller designer. The typical parameter values may further be used as a reference value in conjunction with a maximum change or delta value to limit the amount of permissible change experienced by the calculated parameter value in any given adaptation cycle. Stated another way, the controller designer may define a maximum change value to limit the calculated decrease and/or increase of the parameter value in response to an anomalous disturbance signal. Upon completion of the controller with the initial parameters for state $S_j$, the adaptation cycle may be executed, as shown in block 148. The adaptation cycle 148, as discussed in more detail below, customizes the model $Mod_i$ by determining adaptive parameter values responsive to the measured change of the process 110.

Referring again to FIG. 9, the output signal of the model set component 128, identified by the variable Y(t), and the concurrent output of the process 110, identified by the variable y(t), are delivered to the error generator node 126. The output 126c of error generator node 126, error signal e(t), is coupled to the input 130a of the model evaluation component 130. The error signal e(t) is the difference between the process output y(t) and the output of model $Mod_i$ Y(t) at time t. In a manner to be explained below, the model evaluation component 130 computes a model squared error corresponding to each model $Mod_i$ and assigns the model squared error to parameter values represented in the model $Mod_i$.

The output 130b of the model evaluator 130 is communicated to the input 132a of the parameter interpolator 132. The parameter interpolator 132 calculates an adaptive parameter value for parameters represented in the model $Mod_i$. The output 132b of the parameter interpolator 132 is coupled to the model set 128, and the output 132c of the parameter interpolator 132 may be coupled to the input 136a of the controller update component 136. The output 136b is applied to the PID controller 112 and the output 136c is applied to the feedforward controller 114. The controller update component 136 communicates adaptive parameter values to the PID controller 112 and the feedforward controller 114 at the completion of an adaptation cycle. FIG. 9 further illustrates an excitation generator component 138 having an output 138a coupled to the input 116d of the input node 116. The excitation generator 138 includes an output 138b coupled to an input 120c of the process input node 120.

The supervisor component 134 has a plurality of signal inputs 134b, 134c, 134d respectively coupled to the process input signal u(t), to the process output signal y(t), and to the disturbance signal d(t). The supervisor component 134 further includes an input 134a coupled to the output 130h of the model evaluation component 130. The supervisor 134 includes a first control output 134e coupled to parameter interpolator component 132, a second control output 134f coupled to the model evaluation component 130, and a third control output 134g coupled to the controller update component 136. In addition to performing other functions, the supervisor component 134 operates to detect changes in the process output y(t), changes in the process input u(t) from the PID controller 112, and changes in the disturbance (feedforward) input d(t). When a change in the magnitude of any of these signals y(t), u(t) and d(t) exceeds a predetermined minimum or threshold level, the supervisor 134 initiates an adaptation cycle. The supervisor 134 is communicatively connected to the various elements of the control system 128, 130, 132, 136, 138 and 124, as shown by the dashed lines in FIG. 9, and is therefore able to determine the status of the individual elements operating within the control system. An exemplary embodiment of the model evaluation may include the following steps:

(1) identification and initiation of the model state;
(2) model initiation and adjustment of model output to current process output;
(3) incremental update of model based on specifications in the u(t) and/or d(t) signals and
(4) computation of model squared error or other norms such as the absolute value of the error.

Specifically, the process of adaptation of the feedback/feedforward PID controller is based on the application of interpolative techniques to model parameter values. In this exemplary embodiment of the device, the model squared error, $E_i(t)$ may be defined, for each model in a scan, by the equation:

$$E_i(t)=(y(t)-Y_i(t))^2 \qquad \text{[Equation 1]}$$

where:
y(t) is the process output at the time t,
$Y_i(t)$ is the output of model $Mod_i$ at time t,
$E_i(t)$ is the squared error attributed to $Mod_i$, and
$E(t)=[E_1(t), \ldots, E_i(t), \ldots, E_n(t)]$ is the squared error vector for $Mod_i$, where i=, . . . , N at time t.

The model squared error $E_i(t)$ is assigned to every parameter value of the model $Mod_i$, provided that the parameter value is represented in the evaluated $Mod_i$. If a specific parameter value is not represented in the evaluated model, the parameter value may be assigned a zero or a null value. Iteratively, the $Mod_{i+1}$ is evaluated, and a model squared error $E_{i+1}(t)$ is computed for the evaluated model. The computed model squared error is assigned to every parameter value of the $Mod_i$. As $E_i(t)$ is calculated during each model evaluation, and is assigned to the parameter values represented in the respective models, an accumulated total of assigned model squared errors is maintained for each parameter value. The process evaluation iterates until all models, i=1, . . . , N, are evaluated. A complete sequence, where each model $Mod_i$ is evaluated once, and a corresponding model squared error, $E_i(t)$, is calculated, is referred to as a model scan. As a result of this sequence of evaluations, or model scan, each parameter value has assigned a sum of squared errors from all models in which the specific parameter value has been used. Therefore, as a result of every model scan, each parameter value, $p^{kl}$, where k=1, . . . , m and l=1, . . . , n will be assigned a Norm:

$$Ep^{kl}(t) = \sum_{i=1}^{N} X_{kl}E_i(t) \qquad \text{[Equation 2]}$$

where:
$Ep^{kl}(t)$ is the Norm assigned to the parameter value $p^{kl}$ as a result of scan t,
N is the total number of models, and
$X_{kl}=1$ if parameter value $p^{kl}$ is used in the $Mod_i$, and $X_{kl}=0$, if parameter value $p^{kl}$ is not used iii the $Mod_i$.

The evaluation process is repeated in the next scan and a Norm $Ep^{kl}(t)$ resulting from sum of the squared errors $E_i(t)$ assigned during that scan is combined with the Norm values computed during the prior scan(s). The repeated sequences of model scans is collectively referred to as an adaptation cycle and continues, under control of the supervisor 134, until a predetermined number of scans is completed, or until there has occurred an adequate number of excitations to the process input, whichever condition is, for example, satisfied first.

As a result of this procedure, every parameter value $p^{kl}$ has assigned an accumulated value of the Norm determined during an adaptation cycle:

$$sumEp^{kl}(t) = \sum_{i=1}^{M} Ep^{kl}(t). \qquad \text{[Equation 3]}$$

At the end of the adaptation cycle, the inverse of the sum is calculated for every parameter value $p^{kl}$:

$$F_{kl} = \frac{1}{sumEp^{kl}} \qquad \text{[Equation 4]}$$

In as much as $F_{kl}$ is the inverse of the sum of the model squared errors, the variable $F_{kl}$ may be intuitively seen as a measure of the fitness of the parameter value. Then, for every parameter $p^k$, there is calculated an adaptive parameter value $p^k(a)$ that is a weighted average of all values of this parameter:

$$p^k(a)=p^{kl}*f_{kl}+ \ldots +p^{kl}*f_{kl}+ \ldots +p^{kn}*f_{kn}, \qquad \text{[Equation 5]}$$

where:

$$\text{relative fitness } f_{kl} = \frac{F_{kl}}{sumF_{kl}} \qquad \text{[Equation 6]}$$

$$sumFK = F_{k1} + \ldots + F_{kl} + \ldots + F_{kn} \qquad \text{[Equation 7]}$$

Accordingly, each factor $F_{kl}$ may be viewed as a corresponding to normalized fitness for the respective parameter value.

The adaptive parameter values, as calculated above, define a new model set, with center parameter values $p^k(a)$, k=1, . . . m, and range of parameter values between upper and lower bounds, to be assumed in the design. The range of changes defined as $+\Delta\%$ to $-\Delta\%$, and should be represented by two or more additional parameter values. For example, if the adaptation cycle yields the adaptive parameter value $p^k(a)$ then it is necessary to define at least two additional parameters that assume the value $p^k(a)[1+\Delta\%]$, and the value $p^k(a)[1-\Delta\%]$, for the new model evaluation. In other words, each parameter has defined lower and upper bounds for adaptation such that the values $p^k(a)$ are limited to the bound value. After a model has been updated, that is, upon completion of an adaptation cycle, controller update may take place based on the updated $p^k(a), k=1, \ldots, m$ model parameter values. Adaptation may be applied to the entire model or may be limited to the PID/feedback or feedforward portion of the model, e.g., the portion of the model that relates the output with the inputs when predetermined minimum excitation level are realized. In addition, external excitations may be injected into feedback loop, via the excitation generator 138 operating under the control of the supervisor 134, in situations where inadequate excitation fails are realized within the control system.

Model adaptation may further be implemented in a sequential manner, for example, a single parameter value which may be DT can be adapted while the remaining parameters (e.g., Tc and Gain) are held constant. In this manner each parameter can be adapted while holding the remaining parameters, which may or may not have been adapted in previous adaptation cycles, constant. Sequential adaptation methods advantageously provide for faster convergence of the desired adaptive parameter value $p^k(a)$.

FIG. 10 illustrates an exemplary adaptive parameter interpolation procedure including a first order plus dead time process model for the feedback and feedforward control loops. For this particular example, assume three values are defined for every parameter and that the adaptation range is predetermined to be $(+\Delta\%)$ to $(-\Delta\%)$ in one cycle. Then for every process input u(t) and disturbance d(t) there is encountered the model set depicted in FIG. 11. In FIG. 11:

DT is the central value of the Deadtime parameter;
(DT−) is (DT−Δ%);
(DT+) is (DT+Δ%);
Tc is the central value of the Time Constant parameter;
(Tc−) is (Tc−Δ%);
(Tc+) is (Tc+Δ%);
Gain is the central value of the Gain parameter;
(Gain−) is (Gain−Δ%); and
(Gain+) is (Gain+Δ%).

The number of switching combinations resulting from the configuration of FIG. 11 is 3×3×3=27. However, if both inputs in the model of FIG. 10 are used for adaptation, the number of switching combinations increases to $27^2=729$. These model combinations, while significant in number, require only three values for each parameter, which simplifies the model computations. Simplified model computations are achieved because the controller adaptation is driven by parameter evaluation, rather than model evaluation. Therefore, it is necessary to perform adaptation based on nine parameter values in the feedback loop and nine parameter values in the feedforward loop. Consequently, the number of parameters evaluated in the disclosed adaptation procedure varies proportionally to the number of parameters, as opposed to the exponential variation experienced in the prior art model evaluation technique.

The computation requirements may be limited by controlling the sequence in which the parameter values are imparted to the model. For example, a parameter with memory, such as Dead Time, may be imparted before a memoryless parameter, such as Gain. Thus, an exemplary sequence, as illustrated in FIG. 11, is Dead Time (DT), Time Constant (Tc), and then Gain.

After comparing every model output with current process output, a table of the sum of squared errors may be constructed. Upon completion of the adaptation cycle, an adaptive parameter value for every parameter may be calculated, as shown in Table 1.

TABLE 1

First-order Plus Dead Time Adaptive Process Model Interpolation

| | Parameter Value | Squared Error (SE) | Inverse SE | Adaptive Parameter Value |
|---|---|---|---|---|
| Dead Time | DT−, DT, DT+ | Eqs. (1), (2), (3) | Eqs. (6), (7) | Eq. (5) |
| Lag | Tc−, Tc, TC+ | | | |
| Gain | Gain−, Gain, Gain+ | | | |

Once the model adaptation cycle has been completed, and the adaptive parameter values established in accordance with the above Table 1, controller update is affected through the operation of controller update component 136. Essentially, the controller update component 136 maps the newly calculated adaptive process parameter values $p^k(a)$ to update values for the tuning parameters that characterize the PID controller 112 and/or the feedforward controller 114. For example, the process parameters DT, Tc and Gain may be mapped into controller parameters Reset, Rate and Gain using any desired or selected tuning rule. Because a complete first order plus dead time process model is described, any known tuning rule can be applied, including Lambda or NC tuning. For the feedforward path, the dynamic feedforward controller design equation has been shown to be applicable:

$$G_{ff} = -\frac{Kd}{Ku}\frac{1+sTu}{1+sTd} \qquad \text{[Equation 8]}$$

where:
$G_{ff}$=Feedforward controller transfer function,
Kd=Static gain of the feedforward process dynamics,
Ku=Static gain of the feedback process dynamics,
Kd/Ku=Feedforward controller gain,
Td=Time constant of the feedforward process dynamics (which is applied as the feedforward controller lag), and
Tu=Time constant of the feedback process dynamics (which is applied as the feedforward controller lead).

In summary, the adaptive feedback/feedforward controller that has been described above represents a substantial enhancement of auto-tuning techniques in a scalable process control system by determining a model set (including particular values of model parameters) defining a process model that is applicable for use in tuning the process at a particular process operational state or region.

Although the model parameter adaptation method described above has been described with reference to the specific exemplary embodiments intended to instruct and illustrate the invention, the disclosed adaptive feedback/feedforward controller is not limited to those embodiments. Various modifications, improvements and additions may be implemented by those with shall in the art. For example, as described above, controller adaptation is predicated on statistical interpolation of parameters used to construct a mathematical model of the process under control. Although the process is characterized by three parameters, DT, Tc and Gain, and each of those parameters is assigned three values, the disclosed adaptive feedback/feedforward controller clearly extends to other, and/or a different number of, parameters, each potentially encompassing a different number of assigned values. In addition, the model evaluation and parameter interpolation have been illustrated as individual components identified as the model set 128, the models evaluator 130, the supervisor 134, the parameter interpolator 134, and the controller update 136. Those skilled in the art will understand that the partitioning of individual components is discretionary to those responsible for controller implementation and operation. Similarly, the functions of the disclosed system is susceptible to implementation by either hardware or software, or a combination of the two.

Thus, as will be understood, the adaptation procedure described above can be applied to tune the PID controller at various different process operating points, which may be determined or defined by the state variable input to the controller. That is, a PID controller may be tuned differently at different operating points of the process because the model of the process (e.g., the process characteristics such as dead time, time constant, etc.) may change at different operating points of the process. Generally speaking, the operating point of the process may be defined or measured by the value of one or more process state variables. When this variable changes, the adaptation unit 44 of FIG. 3 may recognize the change and implement a new tuning procedure for the process model to tune the controller algorithm block 42 to provide better control relevant to that process operating point or region.

More particularly, during operation, the adaptive tuning block 44 of FIG. 3 may use an adaptation procedure, such as the one described in detail above, to determine a set of model parameters for a each of a set of different process operating points or process operating regions. In some cases, each of a number of different process regions may be defined as a range of values for the state parameter, and a set of process model parameters values may be defined for each such process region. Alternatively, different sets of model parameters values may be determined for each of a number of particular process operating points and these process model parameters may be stored in the controller 38 as a model set.

Thus, as will be understood, a particular adaptation procedure may determine a set of process model parameters best applicable for a particular process operating region or for a particular process operating point by taking process measurements at various points (values of the state parameter), and performing a model parameter adaptation procedure, such as the one described above, for these measurements, to determine a single set of model parameters best applicable to the process operating region or point, based on the collected data. Of course, over time, the adaptation procedure may be re-run on newly collected data to determine a new set of model parameters values for a particular process operating region or process operating point, and these new values may be used to update or retune the controller. As noted above, a single set of model parameters may be stored for each of the different process regions, and these model parameter values may be used to retune the controller at various times during operation of the process, such as when the process moves from one region to another region, as determined by the value of the state parameter. Alternatively, a set of model parameters may be stored for various different process operating points, without defining any particular regions, and the set of process model parameters to be used at any particular process operating point may be determined from the stored sets of model parameters using, for example, interpolation.

Figure 12:
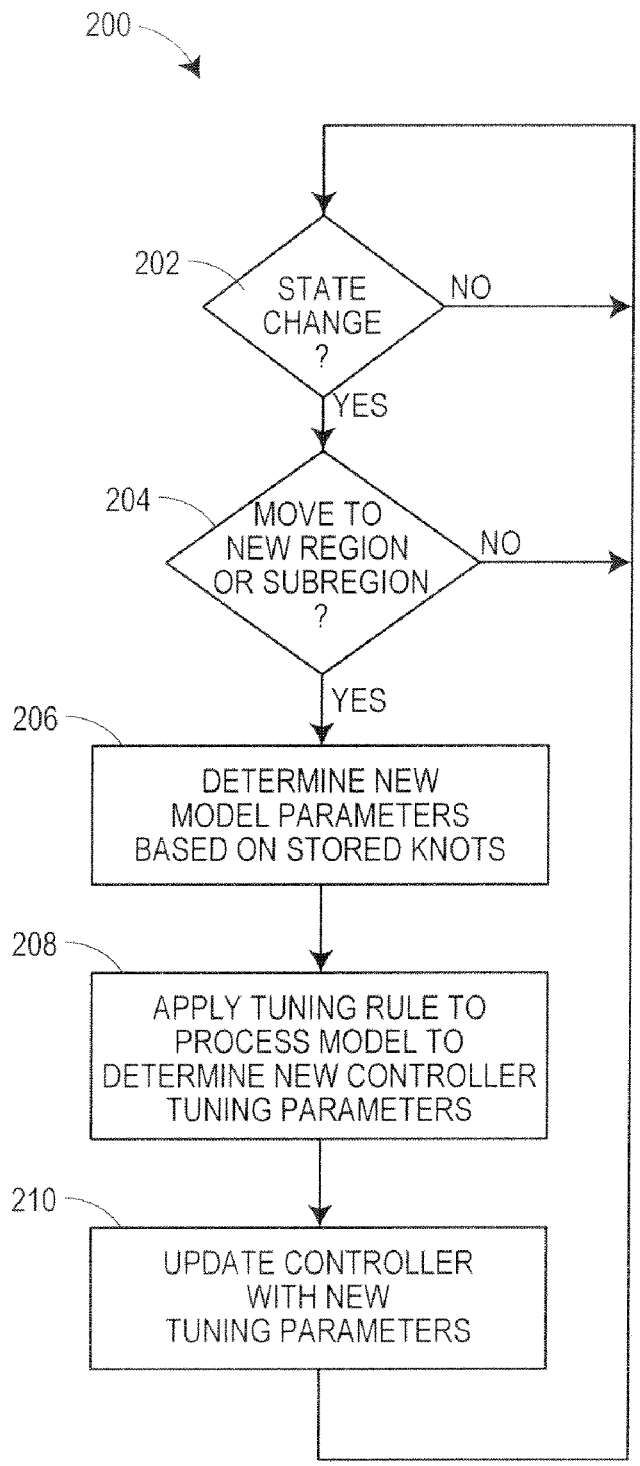
FIG. 12 is flow chart of an example routine or method that implements a tuning procedure that may be implemented by an adaptive controller such as that of FIG. 3.

FIGS. 12-15 illustrate example procedures which may be implemented by the controller 12 of FIG. 1 or FIG. 2 and/or by the control function block 38 of FIG. 3 to implement both a tuning procedure and an adaptation procedure according to the concepts described above. FIG. 12 illustrates a tuning procedure or tuning routine 200 which may be implemented by the function block 38 of FIG. 3, and in particular by the adaptive tuning block 44 of FIG. 3, to implement a tuning procedure. At a block 202, the routine 200 determines whether there is a change in the state variable delivered to the adaptive state variable input of the function block 38. If there is no or only minimal change in the state variable, control returns to the block 202 for the next execution cycle. If, however, the block 202 detects a change in the state variable, for example, over a certain minimal amount (which limit avoids implementing overaggressive tuning or tuning in response to noise), a block 204 determines if the state variable has changed enough to move to a different region or sub-region of the range of the state variable. The region may be a predetermined region associated with FIG. 4 while a sub-region may be that associated with the sub-regions depicted in FIG. 6. In a region-based model parameter determination system, the block 204 may determine whether the change in the state variable has caused the state variable to go from one previously defined region of the state variable to another region of the state variable, while in a continuously scheduled model determination system, the block 204 determines if there is enough movement in the state variable to warrant determining new model parameters. In either case, if the block 204 determines that the state variable has not changed enough to move between regions or sub-regions, then control is returned to the block 202 for execution during the next execution cycle of the controller.

However, if the newly detected state variable value has entered a flew region or sub-region, a block 206 determines new model parameters applicable for that region, sub-region or operating point based on model parameters previously determined and stored for one or more sets of stored knots. One possible manner of determining such a set of model parameter values for the process will be described in detail below with respect to FIG. 13. After the block 206 determines or obtains a set of model parameter values for the new region, sub-region or operating point, a block 208 uses the determined model parameter values and the applicable tuning rule (e.g., as stored in the block 48 of FIG. 3) to determine one or more new controller tuning parameter values, such as new values for a controller gain parameter, a reset parameter and a rate parameter. Of course, the particular controller tuning parameters determined in any particular case will depend on the tuning rules being applied. Additionally, if feedforward adaptation is being performed, the block 208 may determine the dynamic compensation for the dead time and the lead/lag time to be provided to the blocks 52 and 54 of FIG. 3. As noted earlier, the blocks 52 and 54 perform feedforward control based on the feedforward input signal provided to the controller algorithm block (e.g., to the block 42 of FIG. 3).

At a block 210 of FIG. 12, the adaptation tuning block 44 updates the PID controller 42 with the new controller tuning parameters, as determined using the applicable tuning rule and the determined set of model parameter values for the current process operating region, sub-region or point, which in turn is defined by the current state variable value. Moreover, if appropriate, the block 210 provides the new dead time and lead/lag times to the feedforward loop (e.g., the blocks 52 and 54 of FIG. 3) to perform feedforward controller adaptation as well. Thereafter, control is returned to the block 202 of FIG. 12 to repeat the tuning procedure in later controller execution cycles.

Figure 13:
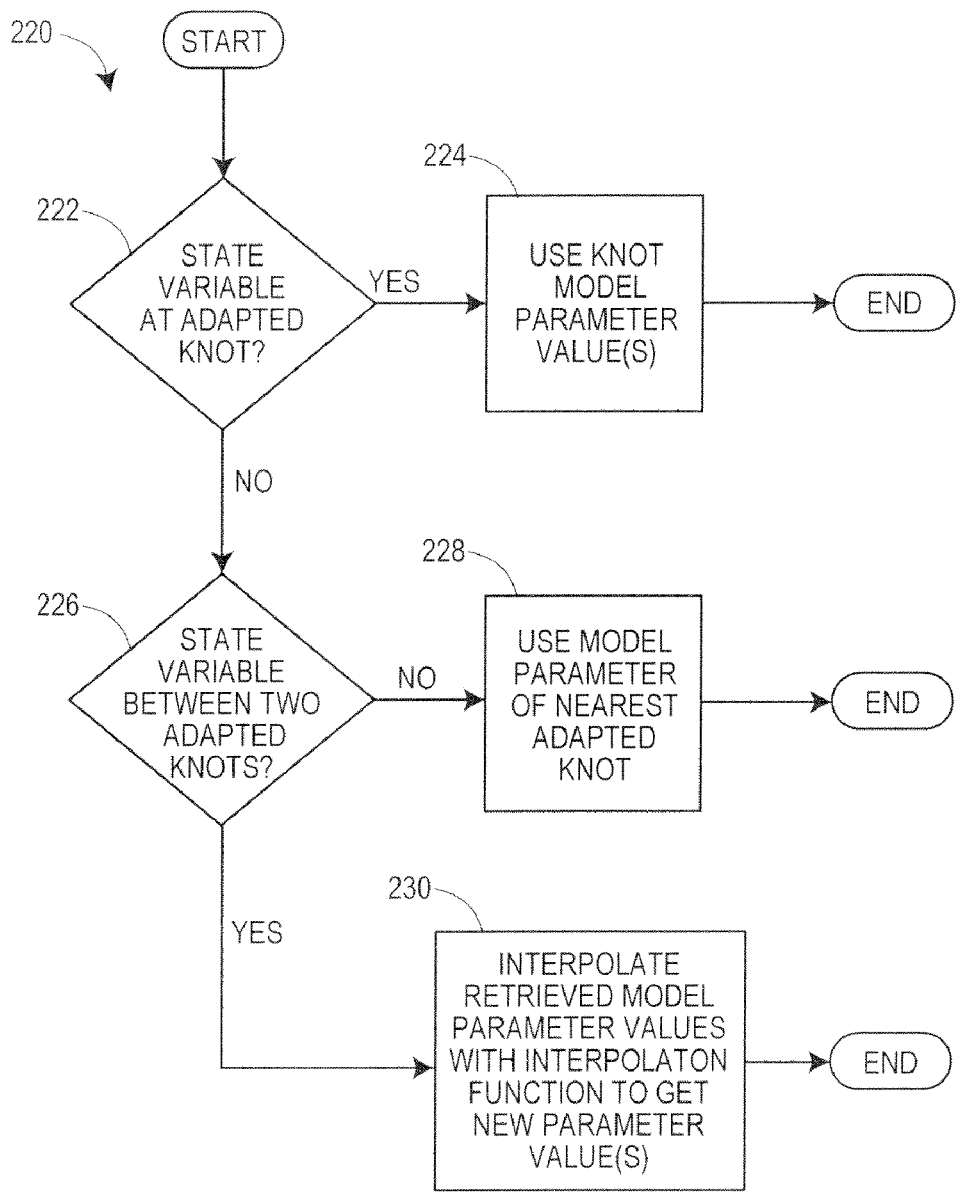
FIG. 13 is a flow chart of an example routine or method that determines one or more process model parameters or use in the tuning procedure of FIG. 12.

One possible operation of the block 206 in determining a set of model parameter values for the current operating region, sub-region or point will be described in more detail with reference to FIG. 13. To perform this analysis, the block 206 may implement a routine 220 as shown in FIG. 13 to determine an appropriate set of model parameters based on the current value of the state variable. The routine 220 includes a block 222 that determines if the state variable is at an adapted knot location (when a continuous model parameter determination technique is used) or if the state variable is within a particular operating region. When the state variable is at an adapted knot or is within the sub-region defined by an adapted knot, a block 224 obtains the one or more model parameter values currently associated with that adapted knot and returns those model parameter values as the model parameter values to be used in determining the controller tuning parameters.

However, if the block 222 determines that the state variable is not at an adapted knot or is not within a sub-region or section associated with a particular adapted knot, a block 226 determines if the state variable is between two adapted knots by determining if the state variable input is between the state variable values associated with two previously determined adapted knot locations. If the current state variable value is not between two adapted knots but is, for example, between an adapted knot and the end of the state variable range, or because only one adapted knot currently exists, a block 228 obtains the model parameter values(s) of the nearest adapted knot and uses these values as the model parameter values for the particular region, sub-region or point. Of course, if there are no adapted knots stored because no adaptation procedures have been yet performed for the process, or if no adapted knots exist in a particular predefined region, the block 228 may determine that the current set of controller tuning parameters should be used instead, and may return those parameters or otherwise indicate that those parameters should be used by the PID controller 42. This operation prevents tuning based on a null set of knots or based on a set of knots which have not been adapted or based on knots which are not applicable to a particular predefined region.

Referring again to FIG. 13, if the block 226 determines that the current state variable value is between two adapted knots, a block 230 interpolates between the model parameters associated with the two closest adapted knots (one on either side of the state variable value) using a previously determined interpolation function for this region to thereby determine the value of the model parameters for the current operating region, sub-region or point. As noted above, the interpolation function can be a linear or non-linear interpolation function. The block 230) then returns these new model parameter value(s) based on the interpolation function between the adapted knots as the model parameter value(s) to be used in the routine 200 of FIG. 12.

Figure 14:
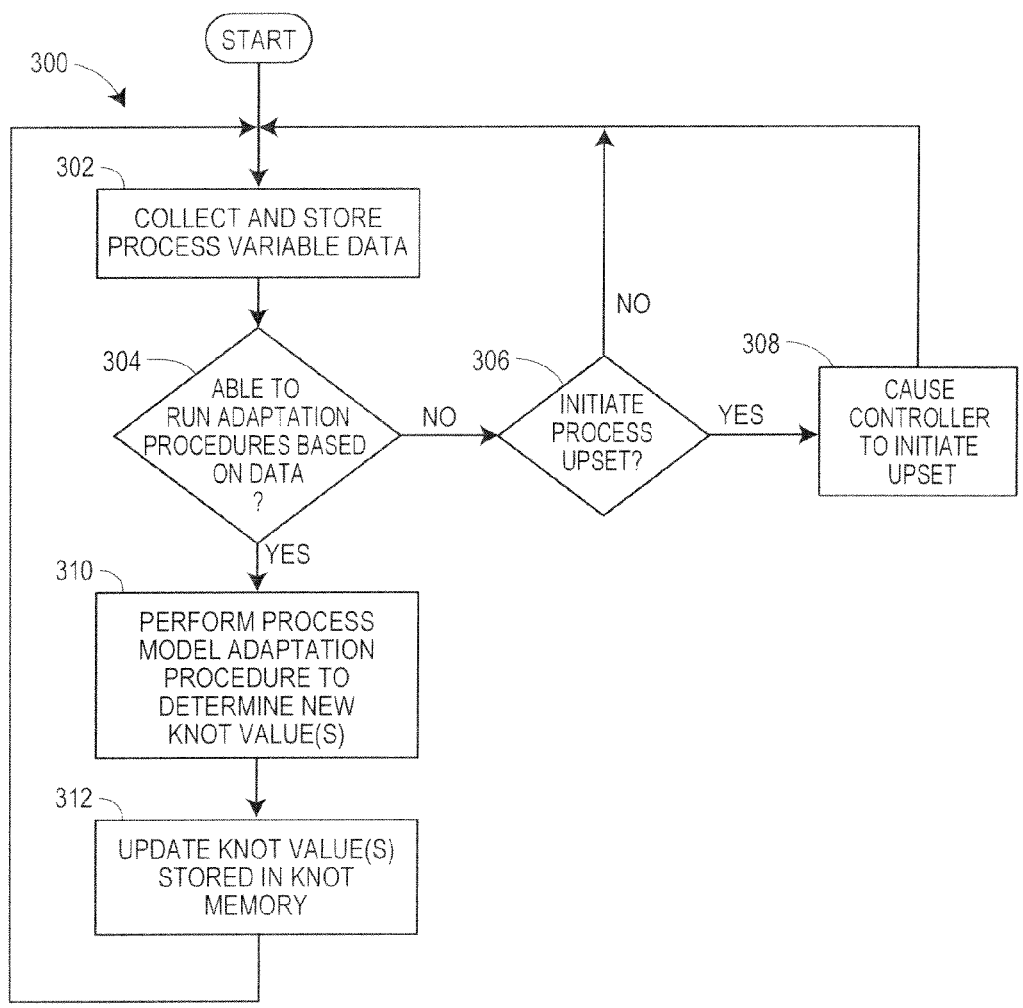
FIG. 14 is a flow chart of an example routine or method that performs an adaptation procedure to determine a new set of process model parameter values at a particular process operating point.

Referring now to FIG. 14, a routine 300 may implement an adaptation procedure during operation of the process control activities performed by the adaptive tuning block 44 of the adaptive PID controller function block 38 of FIG. 3. A block 302 of the routine 300 stores various measurements for a set of predetermined process variables including, for example, various process input data, process output data, disturbance data, etc., for one or more process parameters, it being understood that this data will be used to both detect a change in a process operating point, as well as to determine model parameter values for different knots or regions of the process. A block 304 determines whether it is appropriate, based on the collected data, to run an adaptation procedure. Generally, an adaptation procedure can be run when enough data has been collected for a particular process region or point to perform adaptation and typically it is best to wait until the process reaches a stable or steady state condition before running an adaptation procedure. Additionally, however, an adaptation procedure may be run when the process changes its operating point significantly, such as when the process changes between various predetermined process regions, or significantly changes operating points in response to, for example, a set point change, a process disturbance, etc. Of course, various different criteria can be examined to determine whether the collected data is sufficient to run an adaptation procedure. As noted above, an adaptation procedure can be run when the collected data indicates a significant change in one or more of the process outputs or process inputs over a particular period of time, or when the data indicates that the process has reached a new steady state operating point.

If the block 304 determines that not enough process data has been collected, or there has not been enough of a change in the process operating point to implement an adaptation procedure, a block 306 may determine if it is appropriate to initiate a process upset in order to be able to the collect process data necessary to run an adaptation procedure. The block 306 may, for example, determine if a sufficient period of time has elapsed since the last adaptation procedure has been run or if the process has been in steady state for a sufficient period of time to upset the process. If the block 306 determines that it is not timely or necessary to upset the process to run a new adaptation procedure, control returns to the block 302 which continues to collect the process data. Alternatively, if the block 306 determines that it is timely or necessary to upset the process to run a new adaptation procedure, a block 308 causes the controller block 42 (FIG. 3) to initiate a process upset by changing the process control signals to initiate a change in the one or more process variables being monitored and to collect process data necessary to run an adaptation procedure. Of courses during the procedure of upsetting the process to force a change in the one or more process parameters being monitored, data is collected by the block 302 to perform an adaptation procedure. At the end of the process upset, the data collection block 304 may then determine that it is time to implement an adaptation procedure.

When the block 304 determines that it is appropriate to run a new adaptation procedure based on the previously collected data, a block 310 performs a process model adaptation to determine a new knot, i.e., a new set of model parameter values associated with a particular knot location. The block 310 may implement the model parameter adaptation procedure described above with respect to FIGS. 9-11 to determine an appropriate set of process model parameters that best models the process at a particular process state variable. Of course, other adaptation procedures may be implemented as well or instead to determine process model parameter values associated with a particular value of the state variable.

After the block 310 performs the adaptation procedure, a block 312 updates the knot values stored in the knot memory of the adaptive tuning algorithm block 44 (FIG. 3) for a previously stored knot, or stores values for a new knot or stores values for a previously unadapted knot, and indicates that this knot is now an adapted knot. Thereafter, the adaptation procedure is complete and controls returns to the block 302 to collect and store more process variable data to be used to run a new or further adaptation procedure.

Figure 15:
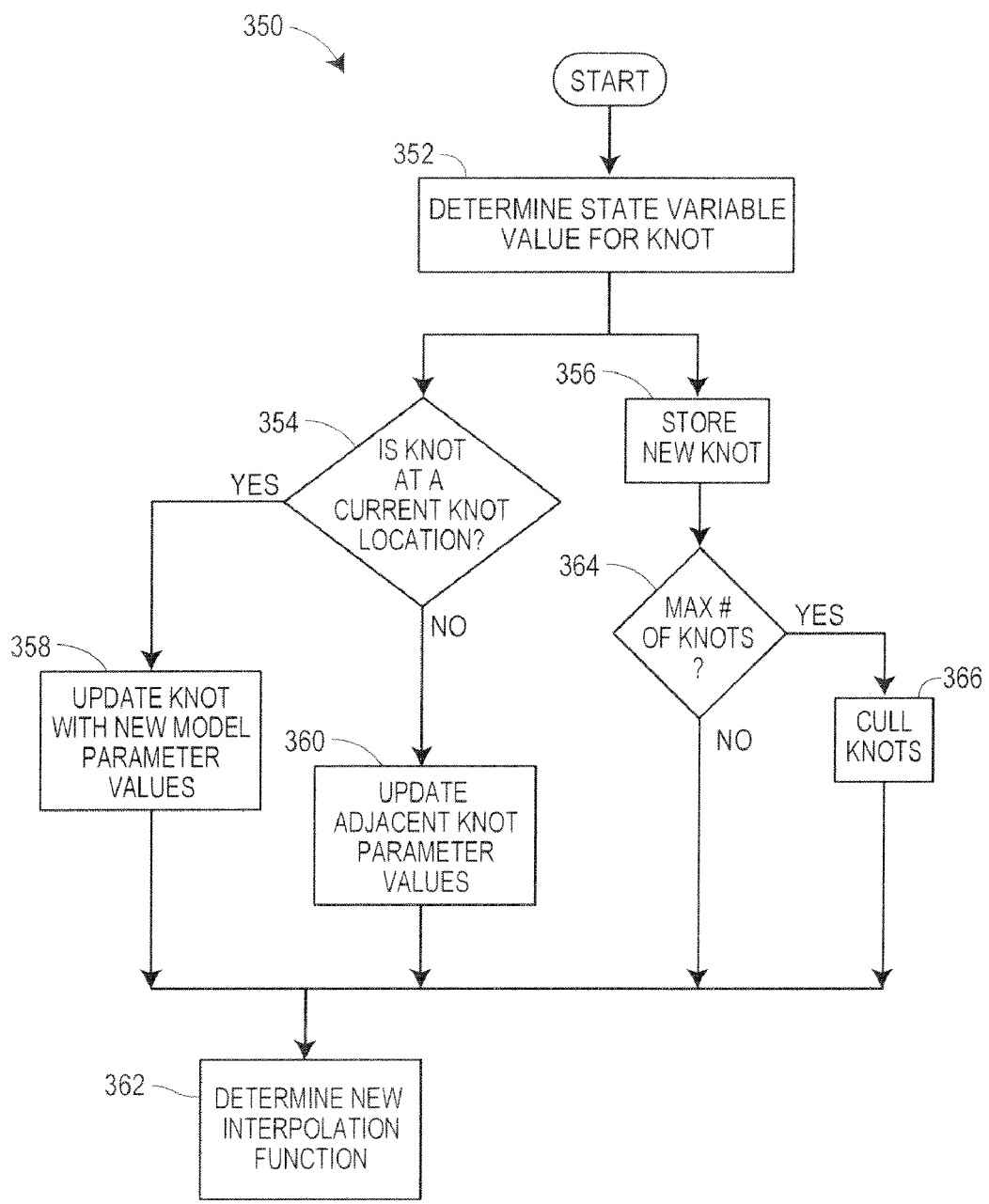
FIG. 15 is a now chart of an example routine or method that updates one or more knots defining a set of stored process model parameter values to be used in performing continuously scheduled model parameter selection in the tuning routine of FIG. 12.

FIG. 15 illustrates a software routine 350 which may be run in the adaptive tuning block 44 of FIG. 3 to determine new knot values during an adaptation procedure. Here, a block 352 determines a particular state variable value defining the location of the knot associated with the adaptation procedure being implemented. As noted above, the state variable may be an average or the midpoint between the highest and the lowest state variable associated with the collected data. However, the state variable value for the knot may be determined in other suitable manners such as, as an average of all the state variable values used in the collected data, as a median value of the state variable values associated with the collected data, or using any other desired method of determining the state variable value associated with an aggregate set of data for various different state variable values.

Next, depending upon the manner in which the knot update procedure is configured, control may be provided to a block 354 or to a block 356. If knots are to be stored at a set of fixed or predetermined knot locations, these knot locations are then updated based on the new knot value. In this case, the block 354 determines if the newly determined knot is at or is significantly near one of the preconfigured or predetermined knot locations. If so, a block 358 updates the knot location with the newly determined set of model parameter values and may mark the knot as being adapted. On the other hand, if the newly determined knot is not at one of the predetermined or fixed knot locations, then a block 360 updates the adjacent knot locations (e.g., the predetermined knots on either side of the newly determined knot) based on the newly determined knot values, using interpolation or the update procedure described above.

In either case, when one or more knots have been updated based on or using the new knot values, a block 362 may be used to determine a new interpolation function which is to be used to determine knot parameter values between those knot locations. Of course, the block 362 may determine a new interpolation function using the interpolation method described above, and may do so individually or differently for each parameter value associated with the process model at the knots. That is, the block 362 may operate to determine an interpolation function that is different or that varies for each of the model parameter values of the model stored in the knots.

If, on the other hand, knots are stored as they are developed at various different knot locations, then a block 356 stores the newly determined knot values and its associated model parameter values in the knot memory. Thereafter, a block 364 determines if the maximum number of knots have been stored in the knot memory, and if not, provides control to the block 362. However, if the maximum number of knots has been reached or has been exceeded by the storage of the new knot, a block 366 may operate to cull the stored knots to thereby reduce the set of stored knots to be at or less than the maximum allowable number. The block 366 may implement any desired set of rules to eliminate at least one knot based on the addition of the new knot. Of course, knots may be culled based on the age of the knots, the concentration of the knots at or near a particular location, the estimated validity of the model parameters at the knots, etc.

In any event after the block 366 culls the stored set of knots, the block 362 determines one or more new interpolation functions between the existing set of knots, especially between existing knots and the newly added knot or between knots near a culled knot location, and stores these new interpolation function(s) in the knot memory to be used by the adaptive tuning block 44 of FIG. 3 during a tuning procedure. The interpolation functions may be stored by storing the type of interpolation to be performed and/or the necessary interpolation variables, such as the sigmoidal interpolation variables described above. After the new interpolation function(s) have been determined by the block 362, the process of determining new knot values is complete.

While the methods described above are specific in nature it is recognized that many other approaches represent but an insubstantial deviation from the embodiments of the invention described above. Consequently, the claims below are properly construed to embrace all modifications, variations and improvements that fall within the true spirit and scope of the invention, as well as substantial equivalents thereof. Accordingly, other embodiments of the invention, though not described with particularly herein, are nonetheless comprehended with the scope of the invention, as defined by the claims below.

What is claimed is:

1. An adaptive controller for use in controlling a process, comprising:
   a controller input to receive a process variable input signal from the process;
   a controller output to provide a process control signal for use in controlling the process;
   a control block coupled between the controller input and the controller output that determines the control signal by implementing process control calculations using the input signal and a set of controller tuning parameters; and
   a tuning block that determines new values for the set of controller tuning parameters during operation of the process using a set of stored process model parameter values and a process state variable, wherein the set of stored process model parameter values includes a process model parameter value for a particular process model parameter for each of a plurality of different process operating points defined by the process state variable; the tuning block including;
      a model adaptation routine that determines the stored process model parameter value for the process model parameter at each of the plurality of different process operating points;
      a model parameter determination routine that stores an interpolation function parameter for determining a particular process model parameter value for a particular process operating point using an interpolation technique based on the process state variable value and two or more of the process model parameter values of the set of stored process model parameter values; and
      a controller tuning parameter routine that determines the set of controller tuning parameters for the particular process operating point from the determined process model parameter value and a stored tuning rule.

2. The adaptive controller of claim 1, wherein the model adaptation routine stores an interpolation function parameter for determining a process model parameter value at process operating points between two or more of the plurality of different process operating points associated with the set of stored process model parameter values using an interpolation technique, and wherein the model parameter determination routine further determines the particular process model parameter value for the particular process operating point using the interpolation function parameter in the interpolation technique.

3. The adaptive controller of claim 2, wherein the interpolation technique is a linear or a non-linear interpolation technique.

4. The adaptive controller of claim 2, wherein the interpolation technique is a linear sigmoidal interpolation technique.

5. The adaptive controller of claim 2, wherein the interpolation technique is a non-linear sigmoidal interpolation technique.

6. The adaptive controller of claim 1, wherein the model adaptation routine updates the set of stored process model parameter values by determining a new process model parameter value for a specific process operating point and changing the set of stored process model parameter values based on the new process model parameter value for the specific process operating point.

7. The adaptive controller of claim 6, wherein the model adaptation routine stores an interpolation function parameter for determining a process model parameter value at process operating points between two or more of the different process operating points associated with the set of stored process model parameter values, and wherein the model adaptation routine determines the set of stored process model parameter values by changing the interpolation function parameter based on the new process model parameter value for the specific process operating point.

8. The adaptive controller of claim 6, wherein the model adaptation routine uses an interpolation function parameter for determining a process model parameter value at process operating points between two or more of the different process operating points associated with the set of stored process model parameter values, and wherein the model adaptation routine updates the set of stored process model parameter values by changing one or more of the stored process model parameter values for the different process operating points based on the interpolation function parameter and based on the new process model parameter value for the specific process operating point.

9. The adaptive controller of claim 6, wherein the model adaptation routine updates the set of stored process model parameter values based on the new process model parameter value for the specific process operating point by storing the new process model parameter value for the specific process operating point as one of the set of stored process model parameter values, and culling the set of stored process model parameter values if the number of process model parameter values within the set of stored process model parameters values reaches a threshold.

10. The adaptive controller of claim 6, wherein the model adaptation routine changes the set of stored process model parameter values based on the new process model parameter value for the specific process operating point by changing two or more of the set of stored process model parameter values without changing their associated process operating points, based on the new process model parameter value at the specific process operating point.

11. The adaptive controller of claim 10, wherein the model adaptation routine changes the two or more of the set of stored process model parameter values using an interpolation technique and the new process model parameter value at the specific process operating point.

12. The adaptive controller of claim 10, wherein the model adaptation routine changes the two or more of the set of stored process model parameter values using a linear interpolation technique based on the new process model parameter value at the specific process operating point.

13. The adaptive controller of claim 10, wherein the model adaptation routine changes the two or more of the set of stored process model parameter values using a non-linear interpolation technique based on the new process model parameter value at the specific process operating point.

14. The adaptive controller of claim 1, wherein the control block implements a feedforward/feedback controller technique.

15. The adaptive controller of claim 1, wherein the set of controller tuning parameters include a feedforward tuning parameter and a feedback tuning parameter.

16. The adaptive controller of claim 1, wherein the particular process model parameter includes a process gain, a deadtime or a time constant.

17. The adaptive controller of claim 1, wherein the control block implements a proportional, integral, derivative controller technique.

18. A method of adaptively tuning a process controller used to control a process, the method comprising:
storing a set of model parameter values characterizing the operation of the process during operation of the process, each of the model parameter values characterizing the operation of the process at a different process operating point with each of the different process operating points being associated with a different process state variable value;
collecting process data during the operation of the process and performing a model characterization procedure based on the collected process data to determine a new model parameter value for one or more process operating points;
updating the stored set of model parameter values with the new model parameter value; and
tuning the process controller using the stored set of model parameter values, including;
determining a current model parameter value for a current process operating point using an interpolation function with two or more of the set of stored model parameter values and the process state variable;
using the determined current model parameter value and a process model based tuning rule to define a set of controller tuning parameter values; and
updating the process controller with the determined set of controller tuning parameter values.

19. The method of adaptively tuning a process controller of claim 18, including using an interpolation function to determine a model parameter value at a process operating point between two or more of the different process operating points associated with the stored set of model parameter values, and determining the current model parameter value for the current process operating point using the interpolation function.

20. The method of adaptively tuning a process controller of claim 19, wherein the interpolation function is associated with a linear interpolation technique.

21. The method of adaptively tuning a process controller of claim 19, wherein the interpolation function is associated with a non-linear interpolation technique.

22. The method of adaptively tuning a process controller of claim 18, wherein updating the stored set of model parameter values includes determining a new model parameter value for a specific process operating point and changing the stored set of model parameter values based on the new model parameter value for the specific process operating point.

23. The method of adaptively tuning a process controller of claim 22, including storing an interpolation function for determining model parameter values at process operating points between two or more of the different process operating points associated with the stored set of model parameter values, and including updating the stored set of model parameter values by changing the interpolation function based on the new process model parameter value for the specific process operating point.

24. The method of adaptively tuning a process controller of claim 22, including storing an interpolation function for determining process model parameter values at process operating points between two or more of the different process operating points associated with the stored set of model parameter values, and including updating the stored set of model parameter values by changing one or more of the stored model parameter values for the different process operating points based on the interpolation function and based on the new process model parameter value for the specific process operating point.

25. The method of adaptively tuning a process controller of claim 22, wherein updating the stored set of model parameter values with the new model parameter value includes storing the new model parameter value for the specific process operating point as one of the stored set of model parameter values, and culling the stored set of model parameter values if the number of model parameter values within the stored set of model parameters values reaches a threshold.

26. The method of adaptively tuning a process controller of claim 22, wherein updating the stored set of model parameter values with the new model parameter value includes changing two or more of the stored set of model parameter values without changing their associated process operating points, based on the new model parameter value at the specific process operating point.

27. The method of adaptively tuning a process controller of claim 26, wherein using the determined current model parameter value and a process model based tuning rule to define a set of controller tuning parameter values includes defining a set of feedforward and feedback controller tuning parameters.

28. An adaptive process controller system, for implementation on a computer processor to control a process, comprising:
a computer memory:
a process controller routine stored on the computer memory and executable on the computer processor to implement a control algorithm that determines a process control signal for use in controlling the process based on a process variable input from the process and a set of controller tuning parameters; and
a tuning routine stored on the computer memory and executable on the computer processor to determine new values for the set of controller tuning parameters during operation of the process using a set of stored process model parameter values and a process state variable, wherein the set of stored process model parameter values includes a process model parameter value for a particular process model parameter for each of a plurality of different process operating points defined by the process state variable; the tuning routine including;
a model adaptation routine that determines the stored process model parameter value for the process model parameter at each of the plurality of different process operating points;
a model parameter determination routine that stores an interpolation function parameter for determining a particular process model parameter value for a particular process operating point using an interpolation technique based on the process state variable value and two or more of the process model parameter values of the set of stored process model parameter values; and
a controller tuning parameter routine that determines the set of controller tuning parameters for the particular process operating point from the determined process model parameter value and a stored tuning rule.

29. The adaptive process controller system of claim 28, wherein the model adaptation routine stores an interpolation function parameter for determining a process model parameter value at process operating points between two or more of the plurality of different process operating points associated with the set of stored process model parameter values, and wherein the model parameter determination routine further determines the particular process model parameter value for the particular process operating point using the interpolation function parameter.

30. The adaptive process controller system of claim 29, wherein the model adaptation routine updates the set of stored process model parameter values by determining a new process model parameter value for a specific process operating point and changing the set of stored process model parameter values based on the new process model parameter value for the specific process operating point.

31. The adaptive process controller system of claim 30, wherein the model adaptation routine updates the set of stored process model parameter values by changing the interpolation function parameter based on the new process model parameter value for the specific process operating point.

32. The adaptive process controller system of claim 30, wherein the model adaptation routine updates the set of stored process model parameter values based on the new process model parameter value for the specific process operating point by storing the new process model parameter value for the specific process operating point as one of the set of stored process model parameter values, and culling the set of stored process model parameter values if the number of process model parameter values within the set of stored process model parameters values reaches a threshold.

33. The adaptive process controller system of claim 30, wherein the model adaptation routine changes the set of stored process model parameter values based on the new process model parameter value for the specific process operating point by changing two or more of the set of stored process model parameter values without changing their associated process operating points, based on the new process model parameter value at the specific process operating point.

34. The adaptive process controller system of claim 30, wherein the process controller routine implements a feedforward/feedback controller technique.

* * * * *

UNITED STATES PATENT AND TRADEMARK OFFICE
CERTIFICATE OF CORRECTION

PATENT NO. : 8,280,533 B2  
APPLICATION NO. : 12/489106  
DATED : October 2, 2012  
INVENTOR(S) : Wojsznis et al.

It is certified that error appears in the above-identified patent and that said Letters Patent is hereby corrected as shown below:

In the Specification:

Column 6, line 28, "a example" should be -- an example --.

Column 6, line 46, "a stored sets" should be -- stored sets --.

Column 8, line 9, "routines" should be -- routine, --.

Column 11, line 65, "may used" should be -- may be used --.

Column 17, line 21, "number stored" should be -- number of stored --.

Column 19, line 31, "preformed" should be -- performed --.

Column 27, line 29, "for a each" should be -- for each --.

Column 31, line 40, "have" should be -- has --.

In the Claims:

Column 33, line 66, claim 15 "include" should be -- includes --.

Signed and Sealed this
Twenty-fourth Day of June, 2014

Michelle K. Lee
*Deputy Director of the United States Patent and Trademark Office*